(12) United States Patent
Yuan et al.

(10) Patent No.: US 12,526,053 B2
(45) Date of Patent: Jan. 13, 2026

(54) OPTICAL TRANSMISSION DEVICE AND SYSTEM

(71) Applicant: HUAWEI TECHNOLOGIES CO., LTD., Shenzhen (CN)

(72) Inventors: Shuai Yuan, Shenzhen (CN); Tao Gui, Dongguan (CN); Liangchuan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 18/308,746

(22) Filed: Apr. 28, 2023

(65) Prior Publication Data

US 2023/0275670 A1   Aug. 31, 2023

Related U.S. Application Data

(63) Continuation of application No. PCT/CN2021/121069, filed on Sep. 27, 2021.

(30) Foreign Application Priority Data

Oct. 29, 2020   (CN) .......................... 202011183179.0

(51) Int. Cl.
*H04B 10/50*   (2013.01)
*H04B 10/532*   (2013.01)
(Continued)

(52) U.S. Cl.
CPC ......... *H04B 10/503* (2013.01); *H04B 10/532* (2013.01); *H04B 10/61* (2013.01); *H04J 14/02* (2013.01)

(58) Field of Classification Search
CPC ............................. H04B 10/505; H04B 10/61
See application file for complete search history.

(56) References Cited

U.S. PATENT DOCUMENTS

2018/0348592 A1* 12/2018 Hosseini ................. G01S 17/42
2019/0158186 A1    5/2019 Schmogrow et al.
(Continued)

FOREIGN PATENT DOCUMENTS

CN    102589592 A    7/2012
CN    105589506 A    5/2016
(Continued)

OTHER PUBLICATIONS

International Search Report issued in corresponding International Application No. PCT/CN2021/121069, dated Nov. 12, 2021, pp. 1-8.
(Continued)

*Primary Examiner* — Shi K Li
(74) *Attorney, Agent, or Firm* — HAUPTMAN HAM, LLP

(57) ABSTRACT

A first optical transmission device includes a plurality of first lasers having a different corresponding wavelength, a first optical path component, a first modulator, and a first processor portion. The plurality of first lasers is connected to a plurality of optical input ports of the first optical path component respectively. The first optical path component is configured to perform multiplexing on continuous light of different wavelengths emitted by the plurality of first lasers, and perform power splitting of multiplexed continuous light thereby obtaining two paths of continuous light, send a first path of continuous light to the first modulator, and send a second path of continuous light to a second optical transmission device at a peer end. The first processor portion is configured to send a first analog signal to the first modulator. The first modulator is configured to at least modulate the first analog signal onto the first path.

15 Claims, 9 Drawing Sheets

(51) Int. Cl.
*H04B 10/61* (2013.01)
*H04J 14/02* (2006.01)

(56) References Cited

U.S. PATENT DOCUMENTS

| | | | |
|---|---|---|---|
| 2019/0312646 A1* | 10/2019 | Earnshaw | H04J 14/02216 |
| 2020/0169056 A1* | 5/2020 | Popovic | H04B 10/506 |
| 2021/0159983 A1* | 5/2021 | Morsy-Osman | H04B 10/40 |
| 2022/0149974 A1* | 5/2022 | Kobayashi | H04B 10/6161 |

FOREIGN PATENT DOCUMENTS

| | | |
|---|---|---|
| JP | 2006191604 A | 7/2006 |
| JP | 2013005065 A | 1/2013 |
| JP | 2019036618 A | 3/2019 |
| JP | 2020010345 A | 1/2020 |

OTHER PUBLICATIONS

Japanese Office Action issued in corresponding Japanese Application No. 2023-526333, dated Jun. 4, 2024, pp. 1-12.

\* cited by examiner

OPTICAL TRANSMISSION DEVICE AND SYSTEM

CROSS-REFERENCE TO RELATED APPLICATIONS

The present application is a continuation of International Application No. PCT/CN2021/121069, filed on Sep. 27, 2021, which claims priority to Chinese Patent Application No. 202011183179.0, filed on Oct. 29, 2020, the disclosures of the aforementioned applications are hereby incorporated by reference in their entireties.

TECHNICAL FIELD

This application relates to the field of optical communication technologies, and in particular, to an optical transmission device and system.

BACKGROUND

With the progress of the society, people have increasingly higher requirements on a data transmission speed. Correspondingly, optical communication technologies are widely used because of features of a high transmission speed and high reliability.

A coherent transmission system is a data transmission system in the field of optical communication technologies. In the coherent transmission system, lasers with a same frequency are disposed at a transmit end and a receive end to output same continuous light. The transmit end performs data modulation on the continuous light to obtain signal light and sends the signal light to the receive end. A coherent receiver is disposed at the receive end. The receive end inputs, into the coherent receiver, the received signal light and continuous light that is output by a local laser. The continuous light is used as local oscillator light to perform coherent detection on the signal light and convert an optical signal into an electrical signal.

In some approaches, the laser has a specific frequency offset. If a frequency difference between the laser at the transmit end and the laser at the receive end is large, data carried by the signal light cannot be obtained through the coherent detection. Therefore, the system of some approaches requires high precision of the laser.

SUMMARY

To resolve a problem of some approaches where an excessively high precision requirement is imposed on a laser, at least one or more embodiments of the present application provide an optical transmission device and system.

According to a first aspect, a first optical transmission device 1 is provided. The first optical transmission device 1 includes a plurality of first lasers 11 of different wavelengths, a first optical path component 12, a first modulator 13, and a first processing part 14. The plurality of first lasers 11 of different wavelengths are optically connected to a plurality of optical input ports of the first optical path component 12 respectively. The first optical path component 12 is configured to: perform multiplexing on continuous light of different wavelengths emitted by the plurality of first lasers 11 and then perform power splitting to obtain two paths of continuous light, send one path of continuous light to the first modulator 13, and send the other path of continuous light to a second optical transmission device 2 at a peer end. The first processing part 14 is configured to send a first analog signal to the first modulator 13. The first modulator 13 is configured to: modulate the first analog signal onto the path of continuous light sent by the first optical path component 12, to obtain signal light, and send the signal light to the second optical transmission device 2 at the peer end.

In some embodiments, a first optical output port of the first optical path component 12 is optically connected to an optical input port of the first modulator 13. The first processing part 14 is electrically connected to an electrical input port of the first modulator 13. The first optical transmission device 1 may include an optical port 1001 and an optical port 1002, configured to connect to the second optical transmission device 2. An optical output port of the first modulator 13 may be optically connected to the optical port 1001. A second optical output port of the first optical path component 12 may be optically connected to the optical port 1002. Connections in this embodiment of this application may be port interconnection, optical fiber connection, or connection by using another optical conduction component. The first optical transmission device 1 may include an electrical port 1005. The first processing part 14 is electrically connected to the electrical port 1005. The electrical port 1005 is configured to connect to a central processing unit (CPU). When the first optical transmission device 1 is connected to a mainboard, the first processing part 14 establishes an electrical connection to the CPU.

In some embodiments, of the optical transmission device, the optical path component performs the multiplexing on continuous light of a plurality of wavelengths and then performs the power splitting to obtain the two paths of continuous light. Therefore, continuous light output by the first optical output port and the second optical output port of the optical path component is the same. Data modulation is performed, using the modulator, on the continuous light output by the first optical output port to obtain the signal light, and the signal light is sent to the peer end. The continuous light output by the second optical output port is directly sent to the peer end. In this way, the peer end may use the continuous light as local oscillator light, perform coherent detection on the signal light, to obtain corresponding data. In this way, a frequency offset of the laser does not cause a frequency difference between the signal light and the continuous light. Therefore, this can lower a precision requirement for the laser. This can also significantly reduce costs of the laser, especially can greatly reduce overall costs in short-distance transmission application.

In addition, compared with a structure in which a single laser is used as a light source, a structure in which the plurality of lasers of different wavelengths are used as light sources can effectively control costs when power of signal light and continuous light received by a receive end is increased. In this technical field, increasing power of a single laser causes a sharp increase in costs of the laser. For long-distance transmission application, because lasers are used in relatively small quantities, the sharp increase in the costs is tolerable. For short-distance transmission application, because lasers are used in excessively large quantities, the sharp increase in the costs is intolerable. In addition, adding an optical amplifier also causes a sharp increase in costs and power consumption. However, in this embodiment of this application, power of the signal light and power of the continuous light only need to be increased by increasing a quantity of lasers, and costs increase linearly. Therefore, it is very helpful to control overall costs. In addition, power consumption increases linearly, which also helps control overall power consumption.

In some embodiments, the first optical path component 12 is a coupler.

In some embodiments, the coupler may be an N×2 coupler, for example, a 2×2 coupler or a 3×2 coupler. A value of N is determined based on a quantity of the first lasers 11. Only one component needs to be introduced when a coupler is used. This reduces an insertion loss and a power waste.

In some embodiments, the first optical path component 12 includes a first wavelength division multiplexer 121 and a first optical splitter 122, the first wavelength division multiplexer 121 is configured to perform the multiplexing on the continuous light of different wavelengths emitted by the plurality of first lasers 11, and the first optical splitter 122 is configured to perform the power splitting on multiplexed continuous light to obtain the two paths of continuous light.

In some embodiments, the first wavelength division multiplexer 121 includes the plurality of optical input ports and one optical output port. The first optical splitter 122 includes one optical input port, the first optical output port, and the second optical output port. The optical output port of the first wavelength division multiplexer 121 is optically connected to the optical input port of the first optical splitter 122.

In some embodiments, the first optical transmission device 1 further includes a first demodulator 16. The first demodulator 16 is configured to: receive signal light and continuous light sent by the second optical transmission device 2 at the peer end, perform coherent detection based on the received signal light and continuous light to obtain a second analog signal, and send the second analog signal to the first processing part 14.

In some embodiments, the first processing part 14 is electrically connected to an electrical output port of the first demodulator 16. A signal light input port and a local oscillator light input port of the first demodulator 16 are optically connected to the second optical transmission device 2 at the peer end. In this way, the first optical transmission device 1 can not only send data, but also receive data through optical transmission.

In some embodiments, the first optical transmission device 1 further includes a first filter 18 and a second filter 19. The first filter (18) is configured to: send the signal light emitted by the first modulator (13) to the second optical transmission device (2) at the peer end, and send the signal light emitted by the second optical transmission device (2) at the peer end to the first demodulator (16). The second filter (19) is configured to: send the continuous light emitted by the first optical path component (12) to the second optical transmission device (2) at the peer end, and send the continuous light emitted by the second optical transmission device (2) at the peer end to the first demodulator (16).

In some embodiments, the first filter 18 and the second filter 19 may further be optically connected to the second optical transmission device 2 at the peer end. The first filter 18 includes a first optical port 181, a second optical port 182, and a third optical port 183. The first optical port 181 is an optical input port of a transmit optical path. The second optical port 182 is an optical output port of a receive optical path. The third optical port 183 is an optical output port of the transmit optical path and an optical input port of the receive optical path. The second filter 19 includes a fourth optical port 191, a fifth optical port 192, and a sixth optical port 193. The fourth optical port 191 is an optical input port of a transmit optical path. The fifth optical port 192 is an optical output port of a receive optical path. The sixth optical port 193 is an optical output port of the transmit optical path and an optical input port of the receive optical path. The optical output port of the first modulator 13 is optically connected to the first optical port 181 of the first filter 18. The second optical output port of the first optical path processing component 12 is optically connected to the fourth optical port 191 of the second filter 19. The signal light input port of the first demodulator 16 is optically connected to the second optical port 182 of the first filter 18. The local oscillator light input port of the first demodulator 16 is optically connected to the fifth optical port 192 of the second filter 19. The third optical port 183 of the first filter 18 may be configured to be optically connected to the second optical transmission device 2 at the peer end. The sixth optical port 193 of the second filter 19 may be configured to be optically connected to the second optical transmission device 2 at the peer end.

In some embodiments, the first filter 18 may be a coarse wavelength division multiplexer (CWDM). A multi-port side of the CWDM includes the first optical port 181 and the second optical port 182, and a single-port side includes the third optical port 183. The first optical port 181 corresponds to a first wavelength range. The second optical port 182 corresponds to a second wavelength range. The third optical port 183 corresponds to a third wavelength range. The different wavelengths corresponding to the plurality of first lasers 11 fall within the first wavelength range. Different wavelengths corresponding to a plurality of second lasers 21 fall within the second wavelength range. The third wavelength range is a union set of the first wavelength range and the second wavelength range. In this way, the third optical port 183 may transmit a bidirectional optical signal, to implement a single-fiber bidirectional function. The second filter 19 may also be a CWDM. Setting of a wavelength range of the optical port is the same as that of the first filter 18, and details are not described again.

Based on the foregoing single-fiber bidirectional structure of some embodiments, the first optical transmission device 1 needs only two external optical ports, which may be the optical port 1001 and the optical port 1002 respectively. The third optical port 183 of the first filter 18 is optically connected to the optical port 1001. The sixth optical port 193 of the second filter 19 is optically connected to the optical port 1002. In this way, a quantity of optical fibers connected between optical transmission devices can be significantly reduced.

In some embodiments, a first delay compensation component 10 is separately disposed on an optical path between the first filter 18 and the first demodulator 16 and an optical path between the second filter 19 and the first demodulator 16. The first delay compensation component 10 includes a first wavelength division demultiplexer 101 and a second wavelength division multiplexer 102, wavelengths of a plurality of optical output ports of the first wavelength division demultiplexer 101 are respectively the wavelengths of the plurality of first lasers 11, and wavelengths of a plurality of optical input ports of the second wavelength division multiplexer 102 are respectively the wavelengths of the plurality of first lasers 11. An optical fiber is connected between an optical output port of the first wavelength division demultiplexer 101 and an optical input port of the second wavelength division multiplexer 102 that correspond to a same wavelength, each optical fiber has a different length and a length of each optical fiber is determined based on a wavelength corresponding to the optical fiber and a transmission distance between a local end and the peer end.

In some embodiments, calculation of lengths of optical fibers corresponding to the different wavelengths may be: Transmission duration of the different wavelengths is first determined based on the transmission distance between the local end and the peer end, and delays of the different wavelengths are determined based on the transmission duration of the different wavelengths, so that a sum of transmission duration and a delay that correspond to each wavelength is equal. Then, a length of a corresponding optical fiber is determined based on a delay and a transmission speed of each wavelength.

In a case of long-distance transmission of some embodiments, due to impact of first-order dispersion, a delay exists between signal light of different wavelengths. Delay compensation may be performed on an optical path by using the foregoing structure, to ensure accuracy of data transmission.

In some embodiments, the first demodulator 16 is an integrated coherent receiver (ICR).

In some embodiments, the first processing part 14 includes a first processor 141 and a first analog-to-digital converter (ADC) 143. The first analog-to-digital converter 143 is configured to: convert the received second analog signal into a second digital signal, and send the second digital signal to the first processor 141.

In some embodiments, the first analog-to-digital converter 143 is electrically connected to the electrical output port of the first demodulator 16 and the first processor 141 separately. The first processor 141 is electrically connected to the electrical port 1005. In this case, the first processor 141 is a digital signal processor.

In some embodiments, the first processing part 14 includes a first processor 141 and a first digital-to-analog converter (DAC) 142. The first processor 141 is configured to send a first digital signal to the first digital-to-analog converter 142. The first digital-to-analog converter 142 is configured to: convert the first digital signal into the first analog signal, and send the first analog signal to the first modulator 13.

In some embodiments, the first digital-to-analog converter 142 is electrically connected to the electrical input port of the first modulator 13 and the first processor 141 separately. The first processor 141 is electrically connected to the electrical port 1005. In this case, the first processor 141 is a digital signal processor.

In another structure of some embodiments, the first processing part 14 may include only an independent first processor 141. The first processor 141 is an analog signal processor, and may directly process an analog signal, and either an input or an output is an analog signal.

In some embodiments, the first optical transmission device 1 includes first digital-to-analog converters 142 and first modulators 13 that respectively correspond to the wavelengths, and the first optical transmission device 1 further includes a second wavelength division demultiplexer 111 and a third wavelength division multiplexer 112. Wavelengths of a plurality of optical output ports of the second wavelength division demultiplexer 111 are respectively the wavelengths of the plurality of first lasers 11, and wavelengths of a plurality of optical input ports of the third wavelength division multiplexer 112 are respectively the wavelengths of the plurality of first lasers 11. The first optical output port of the first optical path component 12 is optically connected to an optical input port of the second wavelength division demultiplexer 111, each optical output port of the second wavelength division demultiplexer 111 is optically connected to an optical input port of the first modulator 13 that corresponds to a same wavelength, each of the plurality of optical input ports of the third wavelength division multiplexer 112 is optically connected to an optical output port of the first modulator 13 that corresponds to a same wavelength, and an optical output port of the third wavelength division multiplexer 112 is configured to be optically connected to a transmission device at the peer end. Each first digital-to-analog converter 142 is electrically connected to an electrical input port of the first modulator 13 that corresponds to a same wavelength. Internal processing delays of the first digital-to-analog converters 142 corresponding to the different wavelengths are different, and are determined based on corresponding wavelengths and transmission distances between a local end and the peer end.

In some embodiments, calculation of delays corresponding to the first digital-to-analog converters 142 corresponding to the different wavelengths may be: Transmission duration of the different wavelengths is first determined based on the transmission distance between the local end and the peer end, and delays of the different wavelengths are determined based on the transmission duration of the different wavelengths, so that a sum of transmission duration and a delay that correspond to each wavelength is equal. In this way, the delays corresponding to the first digital-to-analog converters 142 corresponding to the different wavelengths are obtained.

In a case of long-distance transmission of some embodiments, due to impact of first-order dispersion, a delay exists between signal light of different wavelengths. Delay compensation may be performed on an electrical path by using the foregoing structure, to ensure accuracy of data transmission.

In some embodiments, an absolute value of a difference between reciprocals of wavelengths of any two first lasers (11) is greater than a preset threshold.

In some embodiments, the preset threshold is a ratio of H to c. H is an upper limit of a frequency width of a photodetector (PD), and c is a speed of light. According to the foregoing setting of the wavelength of the first laser 11, in a coherent detection process, frequencies of unnecessary interfering items may be greater than H. In this way, the PD cannot detect these interfering items. This can improve accuracy of coherent detection.

In some embodiments, the first modulator 13 is a dual-polarization IQ modulator (DP-IQM).

In some embodiments, the DP-IQM may modulate, by using orthogonal phases, four paths of different signals on two polarized lights that are perpendicular to each other. This can increase a data transmission rate.

\ise, the first laser 11 is a distributed feedback (DFB) laser.

In some embodiments, there is no requirement on a frequency offset of the laser. The DFB laser may be used. This can reduce costs. In addition, the DFB laser is characterized by low power consumption compared with a high-precision laser. In a scenario in which an ultra-large quantity of data is transmitted, power consumption of an entire system can be effectively controlled.

According to a second aspect, an optical transmission system is provided. The optical transmission system includes a first optical transmission device 1 and a second optical transmission device 2. The first optical transmission device 1 includes a plurality of first lasers 11 of different wavelengths, a first optical path component 12, a first modulator 13, and a first processing part 14, and the plurality of first lasers 11 of different wavelengths are optically connected to a plurality of optical input ports of the first optical path component 12 respectively. The second optical transmission device 2 includes a second processing part 24 and a second demodulator 26. The first optical path component 12 is configured to: perform multiplexing on continuous light of different wavelengths emitted by the plurality of first lasers 11 and then perform power splitting to obtain two paths of continuous light, send one path of continuous light to the first modulator 13, and send the other path of continuous light to the second demodulator 26. The first processing part 14 is configured to send a first analog signal to the first modulator 13. The first modulator 13 is configured to: modulate the first analog signal onto the path of continuous light sent by the first optical path component 12, to obtain signal light, and send the signal light to the second demodulator 26. The second demodulator 26 is configured to: perform coherent detection based on the received signal light and continuous light to obtain the first analog signal, and send the first analog signal to the second processing part 24.

In some embodiments, the first optical path component 12 is a coupler; or the first optical path component 12 includes a first wavelength division multiplexer 121 and a first optical splitter 122, the first wavelength division multiplexer 121 is configured to perform the multiplexing on the continuous light of different wavelengths emitted by the plurality of first lasers 11, and the first optical splitter 122 is configured to perform the power splitting on multiplexed continuous light to obtain the two paths of continuous light.

In some embodiments, the first optical transmission device 1 further includes a first demodulator 16. The second optical transmission device 2 further includes a plurality of second lasers 21 of different wavelengths, a second optical path component 22, and a second modulator 23, and the plurality of second lasers 21 of different wavelengths are optically connected to a plurality of optical input ports of the second optical path component 22 respectively. The second optical path component 22 is configured to: perform multiplexing on continuous light of different wavelengths emitted by the plurality of second lasers 21 and then perform power splitting to obtain two paths of continuous light, send one path of continuous light to the second modulator 23, and send the other path of continuous light to the first demodulator 16. The second processing part 24 is configured to send a second analog signal to the second modulator 23. The second modulator 23 is configured to: modulate the second analog signal onto the path of continuous light sent by the second optical path component 22, to obtain signal light, and send the signal light to the first demodulator 16. The first demodulator 16 is configured to: perform coherent detection based on the received signal light and continuous light to obtain the second analog signal, and send the second analog signal to the first processing part 14.

In some embodiments, the second optical path component 22 is a coupler; or the second optical path component 22 includes a fourth wavelength division multiplexer 221 and a second optical splitter 222, the fourth wavelength division multiplexer 221 is configured to perform the multiplexing on the continuous light of different wavelengths emitted by the plurality of second lasers 21, and the second optical splitter 222 is configured to perform the power splitting on multiplexed continuous light to obtain the two paths of continuous light.

In some embodiments, the first optical transmission device 1 further includes a first filter 18 and a second filter 19, and the second optical transmission device 2 further includes a third filter 28 and a fourth filter 29. The first filter 18 is configured to: send the signal light emitted by the first modulator 13 to the third filter 28, and send signal light sent by the third filter 28 to the first demodulator 16. The second filter 19 is configured to: send the continuous light sent by the first optical path component 12 to the fourth filter 29, and send continuous light sent by the fourth filter 29 to the first demodulator 16. The third filter 28 is configured to: send the signal light emitted by the second modulator 23 to the first filter 18, and send signal light sent by the first filter 18 to the second demodulator 26. The fourth filter 29 is configured to: send the continuous light sent by the second optical path component 22 to the second filter 19, and send continuous light sent by the second filter 19 to the second demodulator 26.

In some embodiments, a first delay compensation component 10 is separately disposed on an optical path between the first filter 18 and the first demodulator 16 and an optical path between the second filter 19 and the first demodulator 16. The first delay compensation component 10 includes a first wavelength division demultiplexer 101 and a second wavelength division multiplexer 102, wavelengths of a plurality of optical output ports of the first wavelength division demultiplexer 101 are respectively the wavelengths of the plurality of first lasers 11, and wavelengths of a plurality of optical input ports of the second wavelength division multiplexer 102 are respectively the wavelengths of the plurality of first lasers 11. An optical fiber is connected between an optical output port of the first wavelength division demultiplexer 101 and an optical input port of the second wavelength division multiplexer 102 that correspond to a same wavelength, each optical fiber has a different length and a length of each optical fiber is determined based on a wavelength corresponding to the optical fiber and a transmission distance between a local end and a peer end.

In some embodiments, a second delay compensation component 20 is separately disposed on an optical path between the third filter 28 and the second demodulator 26 and an optical path between the fourth filter 29 and the second demodulator 26. The second delay compensation component 20 includes a third wavelength division demultiplexer 201 and a fifth wavelength division multiplexer 202, wavelengths of a plurality of optical output ports of the third wavelength division demultiplexer 201 are respectively the wavelengths of the plurality of second lasers 21, and wavelengths of a plurality of optical input ports of the fifth wavelength division multiplexer 202 are respectively the wavelengths of the plurality of second lasers 21. An optical fiber is connected between an optical output port of the third wavelength division demultiplexer 201 and an optical input port of the fifth wavelength division multiplexer 202 that correspond to a same wavelength, each optical fiber has a different length and a length of each optical fiber is determined based on a wavelength corresponding to the optical fiber and a transmission distance between a local end and a peer end.

In some embodiments, the first demodulator 16 and the second demodulator 26 are ICRs.

In some embodiments, the first processing part 14 includes a first processor 141 and a first analog-to-digital converter 143. The first analog-to-digital converter 143 is configured to: convert the received second analog signal into a second digital signal, and send the second digital signal to the first processor 141.

In some embodiments, the second processing part 24 includes a second processor 241 and a second digital-to-analog converter 242. The second processor 241 is configured to send a second digital signal to the second digital-to-analog converter 242. The second digital-to-analog converter 242 is configured to: convert the second digital signal into the second analog signal, and send the second analog signal to the first modulator 23.

In some embodiments, the second optical transmission device 2 includes second digital-to-analog converters 242 and second modulators 23 that respectively correspond to the wavelengths of the second lasers 21, and the second optical transmission device 2 further includes a fourth wavelength division demultiplexer 211 and a sixth wavelength division multiplexer 212. Wavelengths of a plurality of optical output ports of the fourth wavelength division demultiplexer 211 are respectively the wavelengths of the plurality of second lasers 21, and wavelengths of a plurality of optical input ports of the sixth wavelength division multiplexer 212 are respectively the wavelengths of the plurality of second lasers 21. A first optical output port of the second optical path component 22 is optically connected to an optical input port of the fourth wavelength division demultiplexer 211, each optical output port of the fourth wavelength division demultiplexer 211 is optically connected to an optical input port of the second modulator 23 that corresponds to a same wavelength, each of the plurality of optical input ports of the sixth wavelength division multiplexer 212 is optically connected to an optical output port of the second modulator 23 that corresponds to a same wavelength, and an optical output port of the sixth wavelength division multiplexer 212 is configured to be optically connected to a transmission device at a peer end. Each second digital-to-analog converter 242 is electrically connected to an electrical input port of the second modulator 23 that corresponds to a same wavelength. Internal processing delays of the second digital-to-analog converters 242 corresponding to the different wavelengths are different, and are determined based on corresponding wavelengths and transmission distances between a local end and a peer end.

In some embodiments, the second processing part 24 includes a second processor 241 and a second analog-to-digital converter 243. The second analog-to-digital converter 243 is configured to: convert the received first analog signal into a first digital signal, and send the first digital signal to the second processor 241.

In some embodiments, the first processing part 14 includes a first processor 141 and a first digital-to-analog converter 142. The first processor 141 is configured to send a first digital signal to the first digital-to-analog converter 142. The first digital-to-analog converter 142 is configured to: convert the first digital signal into the first analog signal, and send the first analog signal to the first modulator 13.

In some embodiments, the first optical transmission device 1 includes first digital-to-analog converters 142 and first modulators 13 that respectively correspond to the wavelengths of the first lasers 11, and the first optical transmission device 1 further includes a second wavelength division demultiplexer 111 and a third wavelength division multiplexer 112. Wavelengths of a plurality of optical output ports of the second wavelength division demultiplexer 111 are respectively the wavelengths of the plurality of first lasers 11, and wavelengths of a plurality of optical input ports of the third wavelength division multiplexer 112 are respectively the wavelengths of the plurality of first lasers 11. A first optical output port of the first optical path component 12 is optically connected to an optical input port of the second wavelength division demultiplexer 111, each optical output port of the second wavelength division demultiplexer 111 is optically connected to an optical input port of the first modulator 13 that corresponds to a same wavelength, each of the plurality of optical input ports of the third wavelength division multiplexer 112 is optically connected to an optical output port of the first modulator 13 that corresponds to a same wavelength, and an optical output port of the third wavelength division multiplexer 112 is configured to be optically connected to a transmission device at a peer end. Each first digital-to-analog converter 142 is electrically connected to an electrical input port of the first modulator 13 that corresponds to a same wavelength. Internal processing delays of the first digital-to-analog converters 142 corresponding to the different wavelengths are different, and are determined based on corresponding wavelengths and transmission distances between a local end and the peer end.

In some embodiments, an absolute value of a difference between reciprocals of wavelengths of any two first lasers 11 is greater than a preset threshold, and an absolute value of a difference between reciprocals of wavelengths of any two second lasers 21 is greater than a preset threshold.

In some embodiments, the first modulator 13 and the second modulator 23 are DP-IQMs.

In some embodiments, the first laser 11 and the second laser 21 are DFB lasers.

In some embodiments, for a specific structure, function, and technical effect in the second aspect, refer to corresponding content in the first aspect.

In some embodiments, of the optical transmission device, the optical path component performs the multiplexing on continuous light of a plurality of wavelengths and then performs the power splitting to obtain the two paths of continuous light. Therefore, continuous light output by the first optical output port and the second optical output port of the optical path component is the same. Data modulation is performed, using the modulator, on the continuous light output by the first optical output port to obtain the signal light, and the signal light is sent to the peer end. The continuous light output by the second optical output port is directly sent to the peer end. In this way, the peer end may use the continuous light as local oscillator light, perform coherent detection on the signal light, to obtain corresponding data. In this way, a frequency offset of the laser does not cause a frequency difference between the signal light and the continuous light. Therefore, this can lower a precision requirement for the laser. This can also significantly reduce costs of the laser, especially can greatly reduce overall costs in short-distance transmission application.

In addition, compared with a structure in which a single laser is used as a light source, a structure of some embodiments in which the plurality of lasers of different wavelengths are used as light sources can effectively control costs when power of signal light and continuous light received by a receive end is increased. In this technical field, increasing power of a single laser causes a sharp increase in costs of the laser. For long-distance transmission application, because lasers are used in relatively small quantities, the sharp increase in the costs is tolerable. For short-distance transmission application, because lasers are used in excessively large quantities, the sharp increase in the costs is intolerable. In addition, adding an optical amplifier also causes a sharp increase in costs and power consumption. However, in this embodiment of this application, power of the signal light and power of the continuous light only need to be increased by increasing a quantity of lasers, and costs increase linearly. Therefore, it is very helpful to control overall costs. In addition, power consumption increases linearly, which also helps control overall power consumption.

DETAILED DESCRIPTION

Figure 1:
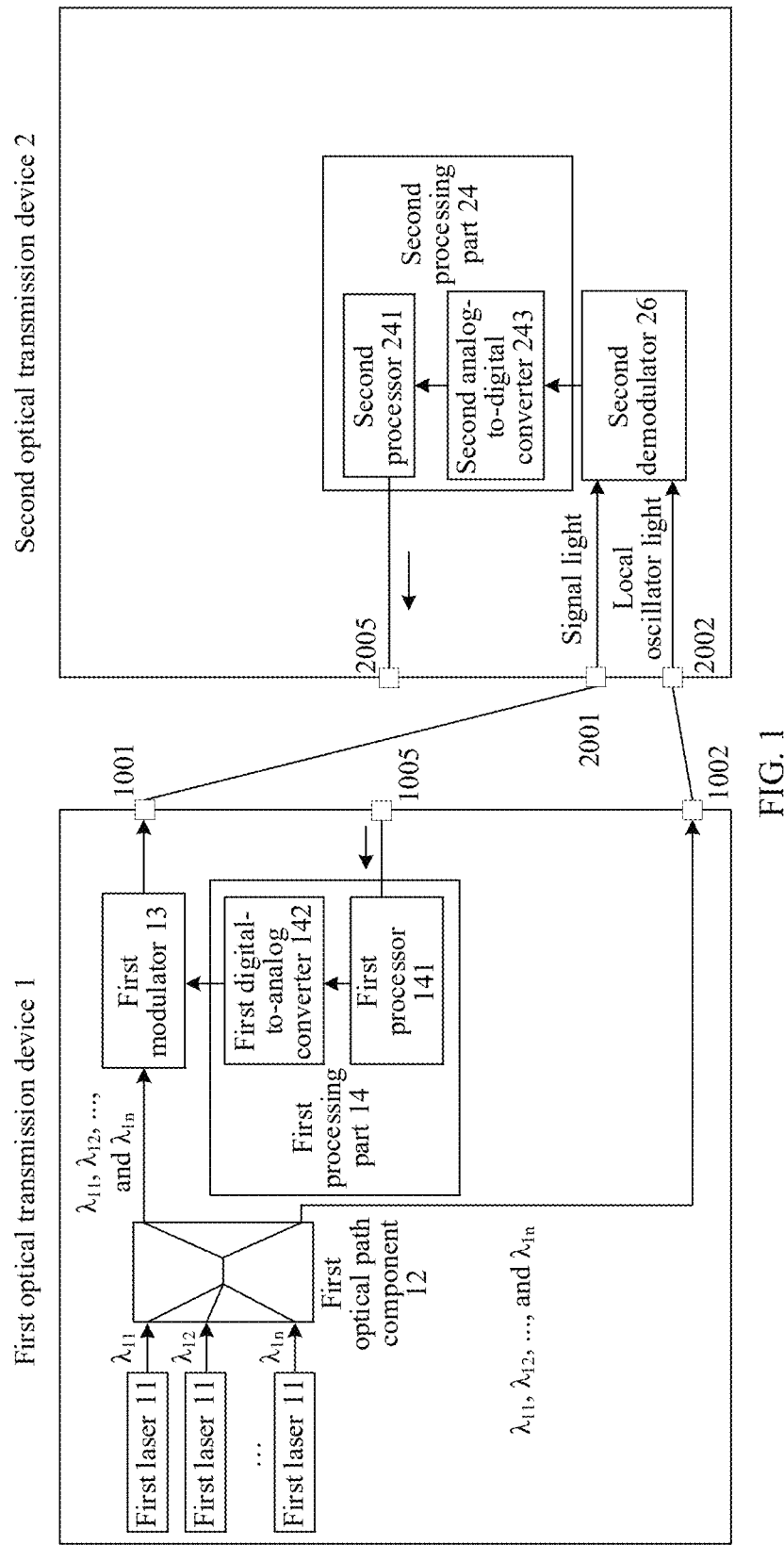
FIG. 1 is a schematic diagram of a structure of an optical transmission system and optical transmission devices in the optical transmission system according to an embodiment of this application.

One or more embodiments of this application provide an optical transmission system. The optical transmission system includes a first optical transmission device 1 and a second optical transmission device 2. A structure of the first optical transmission device 1 and a structure of the second optical transmission device 2 and a connection manner between the first optical transmission device 1 and the second optical transmission device 2 may be shown in FIG. 1. The following separately describes the first optical transmission device 1 and the second optical transmission device 2.

First Optical Transmission Device 1

The first optical transmission device 1 includes a plurality of first lasers 11 of different wavelengths, a first optical path component 12, a first modulator 13, and a first processing part 14. The plurality of first lasers 11 of different wavelengths are optically connected to a plurality of optical input ports of the first optical path component 12 respectively. A first optical output port of the first optical path component 12 is optically connected to an optical input port of the first modulator 13. The first processing part 14 is electrically connected to an electrical input port of the first modulator 13.

The first optical transmission device 1 may include an optical port 1001 and an optical port 1002, configured to connect to another optical transmission device, for example, the second optical transmission device 2. An optical output port of the first modulator 13 may be optically connected to the optical port 1001. A second optical output port of the first optical path component 12 may be optically connected to the optical port 1002. Connections in embodiments of this application may be port interconnection, optical fiber connection, or connection by using another optical conduction component. The first optical transmission device 1 may include an electrical port 1005. The first processing part 14 is electrically connected to the electrical port 1005. The electrical port 1005 is configured to connect to a CPU. When the first optical transmission device 1 is connected to a mainboard, the first processing part 14 establishes an electrical connection to the CPU.

The first laser 11 may be a DFB laser. The DFB laser is characterized by low costs and poor precision, but can meet a requirement of this solution. Power of the continuous light generated by the first lasers 11 may be the same or may be different. Some restrictions may be imposed on the wavelengths of the first lasers 11, and the restrictions may be as follows: An absolute value of a difference between reciprocals of wavelengths of any two first lasers 11 is greater than a preset threshold. An objective of such setting is described in detail in subsequent content.

The first optical path component 12 may be a single device, for example, a coupler, or may be a device including a plurality of components, for example, a combination of a wavelength division multiplexer and an optical splitter. Regardless of whether the first optical path component 12 is a single component or device, the first optical path component 12 has a plurality of optical input ports and two optical output ports externally, and the plurality of optical input ports are optically connected to the first lasers 11 of different wavelengths. The first optical path component 12 is configured to: perform multiplexing on the continuous light of different wavelengths emitted by the plurality of first lasers 11 and then perform power splitting to obtain two paths of continuous light, send one path of continuous light to the first modulator 13 through the first optical output port, and send the other path of continuous light to a second demodulator 26 of the second optical transmission device 2 at a peer end through the second optical output port. Continuous light obtained through the multiplexing has a plurality of wavelengths, $\lambda_{11}, \lambda_{12}, \ldots,$ and $\lambda_{1n}$. Then, the power splitting is performed to obtain the two paths of continuous light that are the same. The two paths of continuous light each have a plurality of wavelengths $\lambda_{11}, \lambda_{12}, \ldots,$ and $\lambda_{1n}$.

The first processing part 14 may be a processing part specially configured to receive and send data. The first processing part 14 is configured to send a first analog signal to the first modulator 13. The first processing part 14 may include only an independent first processor 141. The first processor 141 is an analog signal processor, and may directly process an analog signal, and either an input or an output is an analog signal. Alternatively, the first processing part 14 may include a first processor 141, a first digital-to-analog converter 142, and the like. The first digital-to-analog converter 142 is electrically connected to the electrical input port of the first modulator 13 and the first processor 141 separately, and the first processor 141 is electrically connected to the electrical port 1005. In this case, the first processor 141 is a digital signal processor.

When the first processor 141 is an analog signal processor, the first processor 141 is configured to send the first analog signal to the first modulator 13. A digital-to-analog converter may be disposed on a connection line between the first processor 141 and the CPU, and converts a digital signal output by the CPU into an analog signal and sends the analog signal to the first processor 141. The first processor 141 processes the analog signal to obtain the to-be-sent first analog signal, and sends the to-be-sent first analog signal to the first modulator 13.

When the first processor 141 is a digital signal processor, the CPU may output a digital signal to the first processor 141, the first processor 141 performs preset processing on the digital signal to obtain a to-be-sent first digital signal, the first processor 141 sends the first digital signal to the first digital-to-analog converter 142, and the first digital-to-analog converter 142 converts the first digital signal into the first analog signal, and sends the first analog signal to the first modulator 13. Alternatively, the first processor 141 may not process the digital signal sent by the CPU, but directly send the digital signal to the first digital-to-analog converter 142. In this case, the digital signal is the first digital signal.

The first modulator 13 may be a DP-IQM, and this modulator may modulate, by using orthogonal phases, four paths of different signals on two polarized lights that are perpendicular to each other. The first modulator 13 is configured to: modulate the first analog signal onto the path of continuous light sent by the first optical path component 12, to obtain signal light, and send the signal light to the second demodulator 26. When modulation is performed, a signal is modulated onto continuous light of each wavelength. The signal is the same and is the first analog signal.

Second Optical Transmission Device 2

The second optical transmission device 2 includes a second processing part 24 and the second demodulator 26. The second processing part 24 is electrically connected to an electrical output port of the second demodulator 26. The optical output port of the first modulator 13 is optically connected to a signal light input port of the second demodulator 26. The second optical output port of the first optical path component 12 is optically connected to a local oscillator light input port of the second demodulator 26.

The second optical transmission device 2 may include an optical port 2001 and an optical port 2002, configured to connect to another optical transmission device, for example, the first optical transmission device 1. The signal light input port of the second demodulator 26 may be optically connected to the optical port 2001. The local oscillator light input port of the second demodulator 26 may be optically connected to the optical port 2002. The optical port 2001 may be optically connected to the optical port 1001. The optical port 2002 may be optically connected to the optical port 1002. The second optical transmission device 2 may include an electrical port 2005. The second processing part 24 is electrically connected to the electrical port 2005. The electrical port 2005 is configured to connect to a CPU. When the second optical transmission device 2 is connected to a mainboard, the second processing part 24 establishes an electrical connection to the CPU.

The second demodulator 26 may be an ICR. The second demodulator 26 is configured to: perform coherent detection based on the received signal light and continuous light to obtain the first analog signal, and send the first analog signal to the second processing part 24.

The second processing part 24 may be a processing part specially configured to receive and send data. The second processing part 24 may include only an independent second processor 241. The second processor 241 is an analog signal processor, and may directly process an analog signal, and either an input or an output is an analog signal. Alternatively, the second processing part 24 may include a second processor 241, a second ADC 243, and the like. The second analog-to-digital converter 243 is electrically connected to the electrical output port of the second demodulator 26 and the second processor 241 separately, and the second processor 241 is electrically connected to the electrical port 2005. In this case, the second processor 241 is a digital signal processor.

When the second processor 241 is an analog signal processor, the second processor 241 directly receives the first analog signal sent by the second demodulator 26, and processes the first analog signal to obtain a processed analog signal. An analog-to-digital converter may be disposed on a connection line between the second processor 241 and the CPU, and converts an analog signal processed by the second processor 241 into a digital signal, and sends the digital signal to the CPU.

When the first processor 141 is a digital signal processor, the second demodulator 26 sends the first analog signal to the second analog-to-digital converter 243, the second analog-to-digital converter 243 converts the received first analog signal into the first digital signal, and sends the first digital signal to the second processor 241. The second processor 241 processes the first digital signal, and sends a processed digital signal to the CPU.

Figure 2:
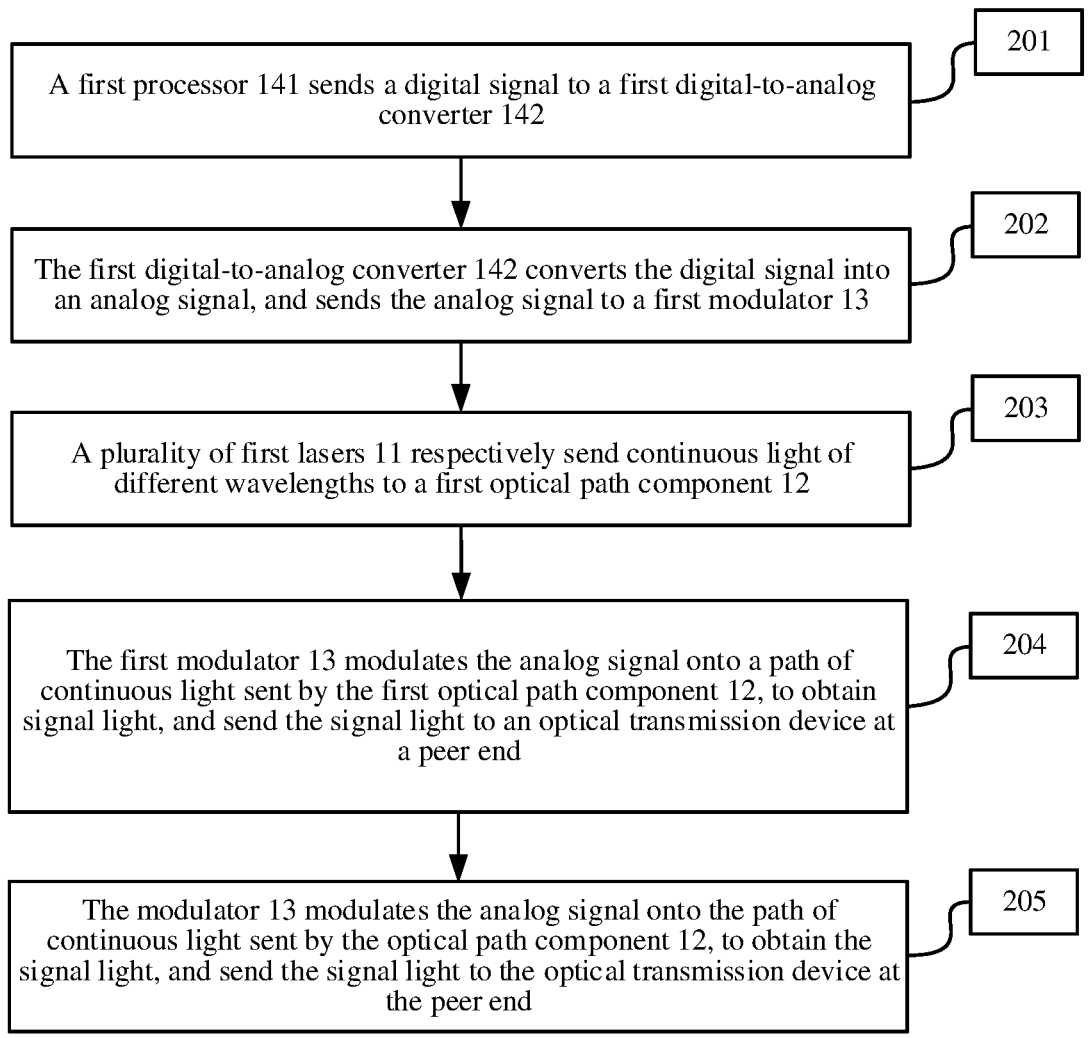
FIG. 2 is a schematic flowchart of data sending processing according to an embodiment of this application.

In the foregoing optical transmission system, the first optical transmission device 1 is a transmit end, and the second optical transmission device 2 is a receive end. The following describes an execution procedure of data sending. Refer to FIG. 2. Processing by a first optical transmission device 1 may include the following steps. In the following steps, a case in which a first processor 141 and a second processor 241 are digital signal processors is used as an example. Other cases are similar, and are not described in detail again in this embodiment.

Step 201: The first processor 141 sends a digital signal to a first digital-to-analog converter 142.

In an implementation, the first processor 141 may obtain data that is generated locally or sent by another part and that is to be sent to an optical transmission device at a peer end, to obtain a corresponding digital signal. Then, the first processor 141 may perform digital signal processing (DSP) on the digital signal. The DSP may be preprocessing performed on the digital signal based on predicted interference in an optical transmission process. This can cancel the interference in the optical transmission process to some extent. Finally, the first processor 141 sends the digital signal obtained through processing to the first digital-to-analog converter 142.

Step 202: The first digital-to-analog converter 142 converts the digital signal into an analog signal, and sends the analog signal to a first modulator 13.

Step 203: A plurality of first lasers 11 respectively send continuous light of different wavelengths to a first optical path component 12.

Step 204: The first optical path component 12 performs multiplexing on the continuous light of different wavelengths emitted by the plurality of first lasers 11 and then performs power splitting to obtain two paths of continuous light, sends one path of continuous light to the first modulator 13 through a first optical output port, and sends the other path of continuous light to an optical transmission device at a peer end through a second optical output port. Specifically, the first optical path component 12 may send the other path of continuous light to a signal light input port of the second demodulator 26 of a second optical transmission device 2 at the peer end.

It should be noted that steps 201 and 202 and steps 203 and 204 are in a parallel execution relationship, and there is no sequence.

Step 205: The first modulator 13 modulates the analog signal onto the path of continuous light sent by the first optical path component 12, to obtain signal light, and sends the signal light to the optical transmission device at the peer end. Specifically, the first modulator 13 may send the signal light to a local oscillator light input port of the second demodulator 26 of the second optical transmission device 2 at the peer end.

Figure 3:
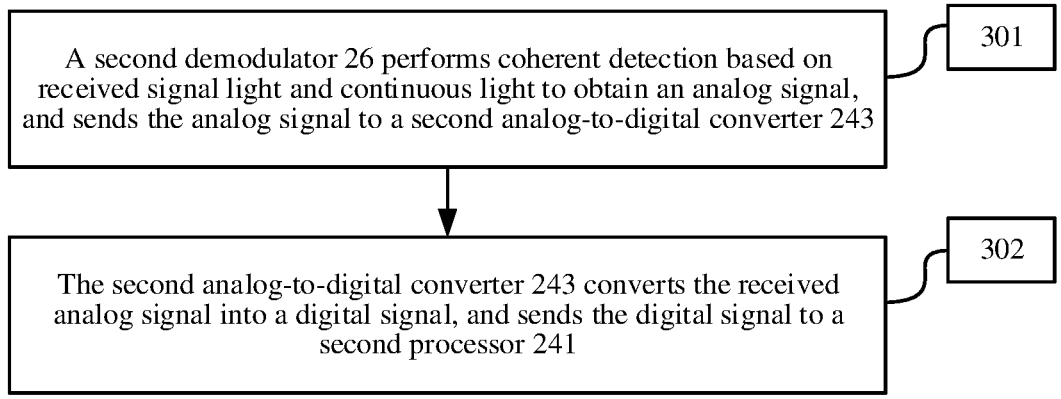
FIG. 3 is a schematic flowchart of data receiving processing according to an embodiment of this application.

Refer to FIG. 3. Processing performed by a second optical transmission device 2 may include the following steps.

Step 301: A second demodulator 26 performs coherent detection based on received signal light and continuous light to obtain an analog signal, and sends the analog signal to a second analog-to-digital converter 243.

In an implementation, an optical transmission device at a peer end may be a first optical transmission device 1, a signal light input port of the second demodulator 26 may receive signal light sent by the first optical transmission device 1, and a local oscillator light input port of the second demodulator 26 may receive continuous light sent by the first optical transmission device 1. The second demodulator 26 performs coherent detection on the signal light by using the continuous light as local oscillator light, and converts an optical signal into an electrical signal. The electrical signal is the analog signal. Then the analog signal is sent to the second analog-to-digital converter 243.

Step 302: The second analog-to-digital converter 243 converts the received analog signal into a digital signal, and sends the digital signal to a second processor 241.

The following describes in detail a process in which the second demodulator 26 performs the coherent detection. An example in which the second demodulator 26 is an ICR and has two first lasers 11 of different wavelengths, an I component of one polarization of signal light (the signal light may include two polarizations, and there are two I and Q components on each polarization) is detected, and different lasers have a same polarization and same power is used. Other cases are similar, and are not described in detail again in this embodiment.

Figure 4:
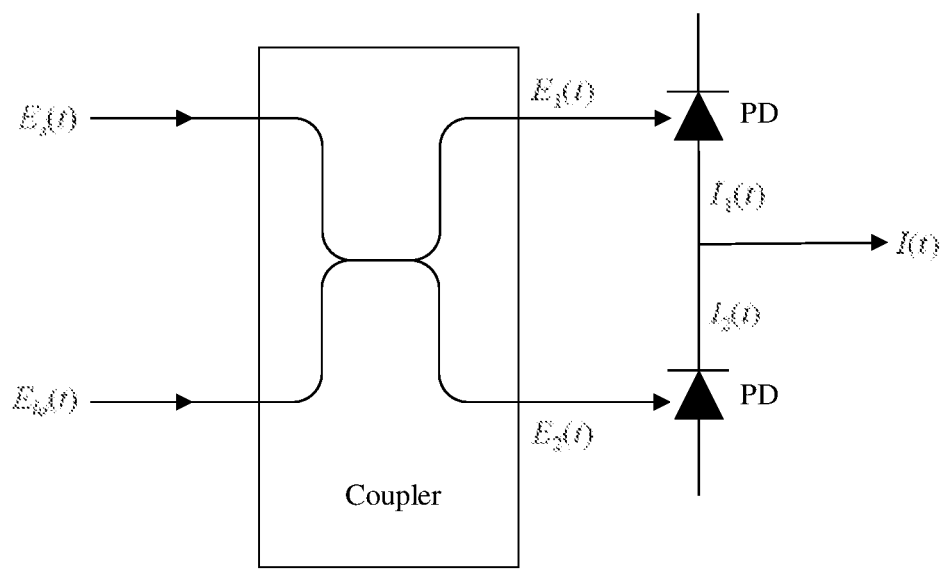
FIG. 4 is a schematic diagram of a part of a structure of an ICR according to an embodiment of this application.

Refer to a diagram of an internal structure of an ICR shown in FIG. 4. FIG. 4 shows a part of the structure of the ICR. In the ICR, a structure shown in FIG. 4 is provided for each component. Signal light $E_s$ and local oscillator light $E_{lo}$ that enter the ICR include two compositions of different frequencies, that is, $$E_s(t) = A_s(t)\exp(-j\omega_1 t) + A_s(t)\exp(-j\omega_2 t)$$

$$E_{lo}(t) = A_{lo}\exp(-j\omega_1 t) + A_{lo}\exp(-j\omega_2 t)$$

$A_s(t)$ is a complex amplitude of the signal light, and $\omega_1$ and $\omega_2$ are angular frequencies of light of different wavelengths. $A_{lo}$ is an amplitude of the local oscillator light, and is a fixed value. Signal light $E_1$ and $E_2$ passing through a coupler are respectively:

$$E_1(t) = \frac{1}{\sqrt{2}}[E_s(t) + E_{lo}(t)]$$

$$E_2(t) = \frac{1}{\sqrt{2}}[E_s(t) - E_{lo}(t)]$$

$E_1$ and $E_2$ are respectively input to two PDs, and the PD detects intensity of the input light. A detection process may be expressed as the following formula:

$$E_1(t) \cdot E_1^*(t) = \frac{1}{2}\{2P_s + 2P_{lo} + 4\sqrt{P_s P_{lo}}\cos(\theta_s) + P_s\exp[j(\omega_1 - \omega_2)t] +$$
$$A_s(t)A_{lo}^*\exp[j(\omega_1 - \omega_2)t] + A_s^*(t)A_{lo}\exp[j(\omega_1 - \omega_2)t] +$$
$$P_{lo}\exp[j(\omega_1 - \omega_2)t] + P_s\exp[j(\omega_1 - \omega_2)t] + A_s(t)A_{lo}^*\exp[j(\omega_1 - \omega_2)t] +$$
$$A_s^*(t)A_{lo}\exp[j(\omega_1 - \omega_2)t] + P_{lo}\exp[j(\omega_1 - \omega_2)t]\}$$

$P_S$ and $P_{lo}$ are respectively intensity of light of any wavelength in the signal light and the local oscillator light, and $\theta_S$ is a signal phase. For the fourth item to the last item on the right of the equation, when a difference between $\omega_1$ and $\omega_2$ is large enough, frequencies corresponding to these items exceed an upper limit of a frequency bandwidth of the PD. In this case, these items are not detected by the PD and may be ignored. In this case, photocurrents $I_1(t)$ and $I_2(t)$ obtained through optical-to-electrical conversion by the two PDs are respectively:

$$I_1(t)P_s = P_{lo} + 2\sqrt{P_s P_{lo}}\cos(\theta_s)$$

$$I_2(t)P_s = P_{lo} - 2\sqrt{P_s P_{lo}}\cos(\theta_s)$$

Finally, a result obtained through balanced detection is as follows:

$$I(t) = I_1(t) - I_2(t) = 4\sqrt{P_s P_{lo}}\cos(\theta_s)$$

Generally, when a single laser is used as a light source, the result obtained through balanced detection is as follows:

$$I(t) = 2\sqrt{P_s P_{lo}}\cos(\theta_s)$$

It can be learned that, compared with using a single laser as a light source, using two lasers of different wavelengths as a light source doubles an amplitude of a result signal. It is equivalent to that output power of a single laser increases by 3 dB.

The frequency f of any one of the fourth item to the last item may be expressed as follows:

$$f = \frac{|\omega_1 - \omega_2|}{2\pi}$$

The upper limit of the frequency bandwidth of the PD is expressed as H. To prevent these items from being detected by the PD, the following condition is met:

$$\frac{|\omega_1 - \omega_2|}{2\pi} = f > H$$

The following is obtained by converting $\omega_1$ and $\omega_2$ into $\lambda_{11}$ and $\lambda_{12}$:

$$\left|\frac{1}{\lambda_{11}} - \frac{1}{\lambda_{12}}\right| > \frac{H}{c}$$

c is a speed of light. In other words, when a first laser 11 is selected, an absolute value of a difference between reciprocals of wavelengths of any two first lasers (11) may be greater than a preset threshold. The preset threshold is a ratio of H to c. In this way, the PD cannot detect the fourth item to the last item on the right of the equation of the formula. This can ensure that an accurate result of coherent detection can be obtained.

It can be learned from the foregoing calculation process that, compared with a structure in which a single laser is used as a light source, a structure of the foregoing optical transmission device can effectively control costs when power of signal light and continuous light received by a receive end is increased. In this technical field, increasing power of a single laser causes a sharp increase in costs of the laser. For long-distance transmission application, because lasers are used in relatively small quantities, the sharp increase in the costs is tolerable. For short-distance transmission application, because lasers are used in excessively large quantities, the sharp increase in the costs is intolerable. In addition, adding an optical amplifier also causes a sharp increase in costs and power consumption. However, in this embodiment of this application, power of the signal light and power of the continuous light only need to be increased by increasing a quantity of lasers, and costs increase linearly. Therefore, it is very helpful to control overall costs. In addition, power consumption increases linearly, which also helps control overall power consumption.

In addition, the optical path component performs the multiplexing on continuous light of a plurality of wavelengths and then performs the power splitting to obtain the two paths of continuous light. Therefore, continuous light output by the first optical output port and the second optical output port of the optical path component is the same. Data modulation is performed, using the modulator, on the continuous light output by the first optical output port to obtain the signal light, and the signal light is sent to the peer end. The continuous light output by the second optical output port is directly sent to the peer end. In this way, the peer end may use the continuous light as local oscillator light, perform coherent detection on the signal light, to obtain corresponding data. In this way, a frequency offset of the laser does not cause a frequency difference between the signal light and the continuous light. Therefore, this can lower a precision requirement for the laser. This can also significantly reduce costs of the laser, especially can greatly reduce overall costs in short-distance transmission application. A common DFB laser may be used. This can reduce costs. In addition, the DFB laser is characterized by low power consumption compared with a high-precision laser. In a scenario in which an ultra-large quantity of data is transmitted, power consumption of an entire system can be effectively controlled.

The first optical transmission device 1 has a data sending function, and the second optical transmission device 2 has a data receiving function. In addition, the second optical transmission device 2 may also have a data sending function, and the first optical transmission device 1 may also have a data receiving function. Correspondingly, a structure of the first optical transmission device 1 and a structure of the second optical transmission device 2 and a connection manner between the first optical transmission device 1 and the second optical transmission device 2 may be shown in FIG. 5. The following separately describes the first optical transmission device 1 and the second optical transmission device 2. In the following content, an example in which a first processing part 14 includes a first processor 141, a first digital-to-analog converter 142, and a first analog-to-digital converter 143, and a second processing part 24 includes a second processor 241, a second digital-to-analog converter 242, and a second analog-to-digital converter 243 is used.

Other cases are similar to the content in the foregoing embodiments. For a related structure and processing of the second digital-to-analog converter 242, refer to the foregoing content about the first digital-to-analog converter 142.

For a related structure and processing of the first analog-to-digital converter 143, refer to the foregoing content about the second analog-to-digital converter 243, details are not described herein again.

Second Optical Transmission Device 2

Based on the structure in FIG. 1, the second optical transmission device 2 further includes a plurality of second lasers 21 of different wavelengths, a second optical path component 22, and a second modulator 23. The second processing part 24 further includes the second digital-to-analog converter 242. The plurality of second lasers 21 of different wavelengths are optically connected to a plurality of optical input ports of the second optical path component 22. A first optical output port of the second optical path component 22 is optically connected to an optical input port of the second modulator 23. The second digital-to-analog converter 242 is electrically connected to an electrical input port of the second modulator 23 and the second processor 241 separately.

The second optical transmission device 2 may include an optical port 2003 and an optical port 2004, configured to connect to another optical transmission device, for example, the first optical transmission device 1. An optical output port of the second modulator 23 may be optically connected to the optical port 2003. A second optical output port of the second optical path component 22 may be optically connected to the optical port 2004. A data port of the second processor 241 is electrically connected to an input port of the second digital-to-analog converter 242. An output port of the second digital-to-analog converter 242 is electrically connected to the electrical input port of the second modulator 23.

The second laser 21 may be a DFB laser. Continuous light generated by each second laser 21 may have two polarizations that are perpendicular to each other, and different continuous light may include a same polarization. Power of the continuous light generated by the second lasers 21 may be the same or may be different. Some restrictions may be imposed on the wavelengths of the second lasers 21, and the restrictions may be as follows: An absolute value of a difference between reciprocals of wavelengths of any two second lasers 21 is greater than a preset threshold. An objective of this setting is the same as that of the first laser 11. For related description content, refer to the content in the foregoing embodiments.

The second processor 241 is configured to send a first digital signal to the second digital-to-analog converter 242.

The second digital-to-analog converter 242 is configured to: convert the first digital signal into a first analog signal, and send the first analog signal to the second modulator 23.

The second optical path component 22 is configured to: perform multiplexing on the continuous light of different wavelengths emitted by the plurality of second lasers 21 and then perform power splitting to obtain two paths of continuous light, send one path of continuous light to the second modulator 23 through the first optical output port, and send the other path of continuous light to a first demodulator 16 through the second optical output port.

The second modulator 23 is configured to: modulate the first analog signal onto the path of continuous light sent by the second optical path component 22, to obtain signal light, and send the signal light to the first demodulator 16.

Specific functions and structures of the foregoing parts are similar to those of the first optical transmission device 1, and reference may be made to the description content of the first optical transmission device 1 in the foregoing embodiments.

First Optical Transmission Device 1

Based on the structure in FIG. 1, the first optical transmission device 1 may further include the first demodulator 16. The first processing part 14 may further include the first analog-to-digital converter 143. The first analog-to-digital converter 143 is electrically connected to an electrical output port of the first demodulator 16 and the first processor 141 separately. A signal light input port of the first demodulator 16 is optically connected to the optical output port of the second modulator 23. A local oscillator light input port of the first demodulator 16 is optically connected to the second optical output port of the second optical path component 22.

The first optical transmission device 1 may include an optical port 1003 and an optical port 1004, configured to connect to another optical transmission device, for example, the second optical transmission device 2. The signal light input port of the first demodulator 16 may be optically connected to the optical port 1003. The local oscillator light input port of the first demodulator 16 may be optically connected to the optical port 1004. The optical port 1003 may be optically connected to the optical port 2003. The optical port 1004 may be optically connected to the optical port 2004. A data port of the first processor 141 is electrically connected to an output port of the first analog-to-digital converter 143. An input port of the first analog-to-digital converter 143 is electrically connected to the electrical output port of the first demodulator 16.

The first demodulator 16 is configured to: perform coherent detection based on the received signal light and continuous light to obtain a second analog signal, and send the second analog signal to the first analog-to-digital converter 143.

The first analog-to-digital converter 143 is configured to: convert the received second analog signal into a second digital signal, and send the second digital signal to the first processor 141. The first processor 141 sends the second digital signal to a CPU, or performs preset DSP processing on the second digital signal, and sends a processed digital signal to the CPU.

Specific functions and structures of the foregoing parts are similar to those of the second optical transmission device 2, and reference may be made to the description content of the second optical transmission device 2 in the foregoing embodiments.

Figure 5:
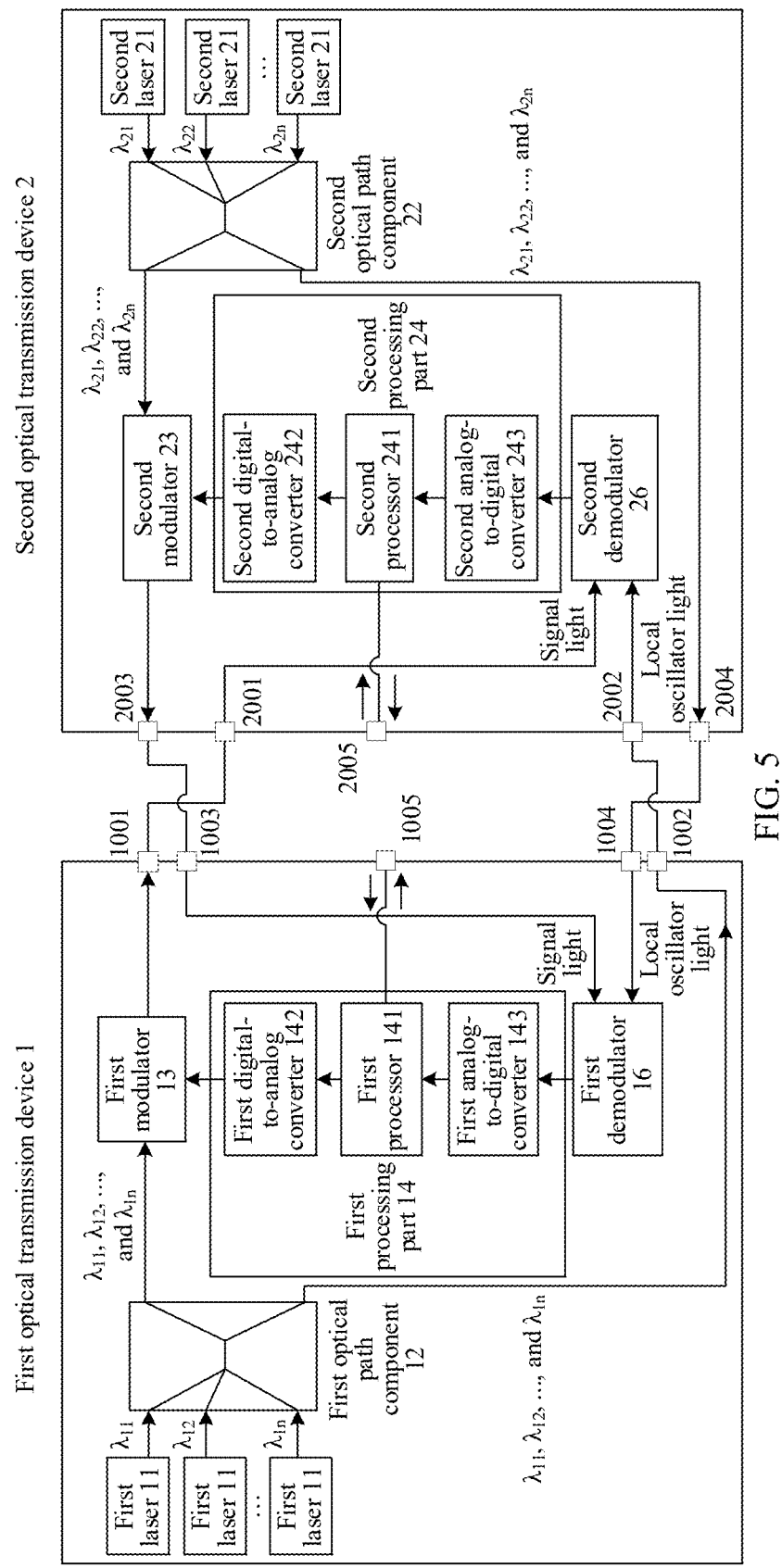
FIG. 5 is a schematic diagram of a structure of an optical transmission system and optical transmission devices in the optical transmission system according to an embodiment of this application.

Based on the optical transmission system in FIG. 5, the first optical transmission device 1 may be a transmit end or a receive end, and the second optical transmission device 2 may be a receive end or a transmit end. A process in which the first optical transmission device 1 sends data to the second optical transmission device 2 is described above. A process in which the second optical transmission device 2 sends data to the first optical transmission device 1 is similar to the process in which the first optical transmission device 1 sends data to the second optical transmission device 2. Details are not described in this embodiment of this application.

Figure 6:
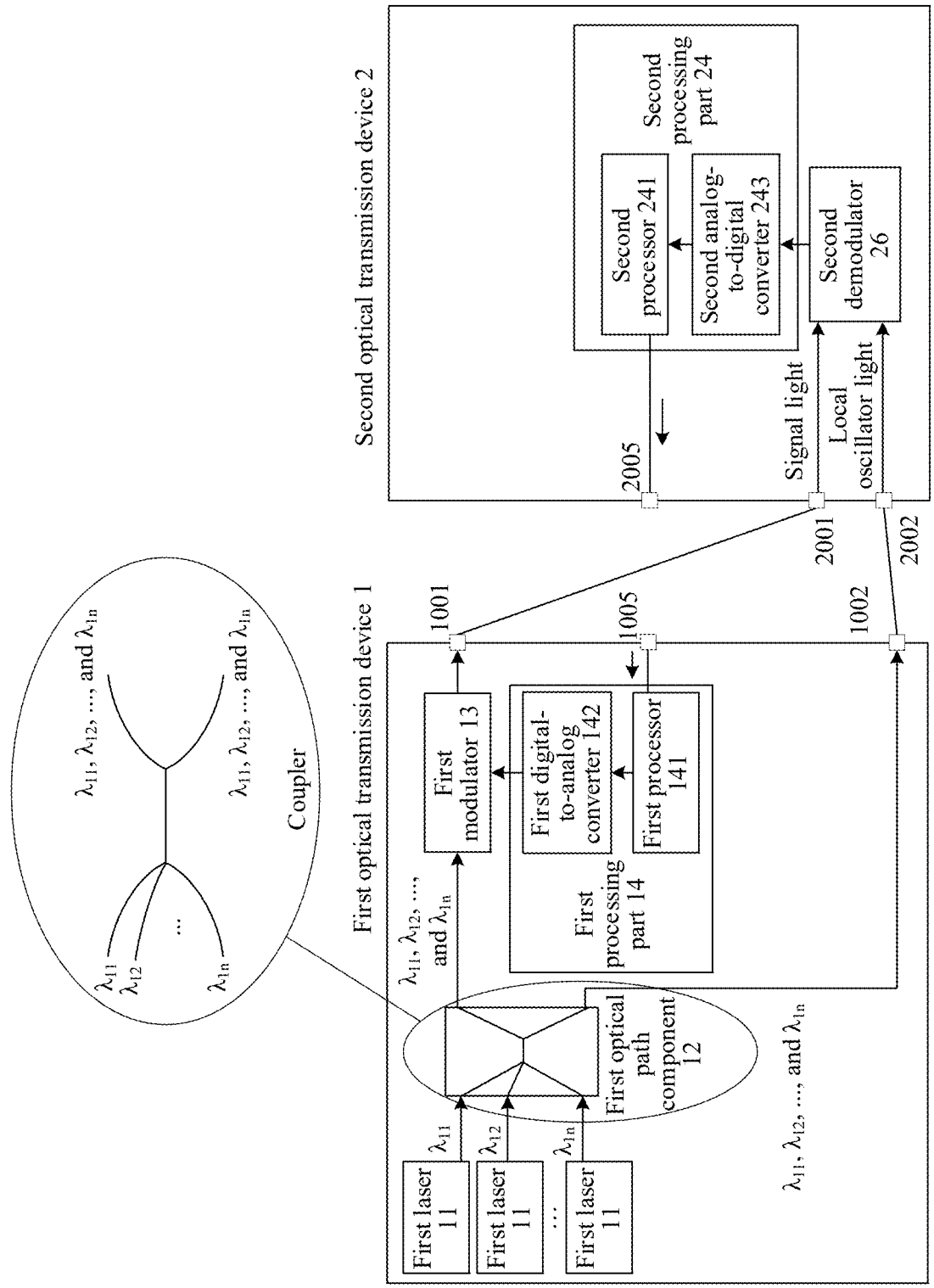
FIG. 6 is a schematic diagram of a structure of an optical transmission system and optical transmission devices in the optical transmission system according to an embodiment of this application.

The first optical path component 12 may be a coupler. As shown in FIG. 6, the coupler may be an N×2 coupler, for example, a 2×2 coupler or a 3×2 coupler. A value of N is determined based on a quantity of the first lasers 11. Only one component needs to be introduced when a coupler is used. This reduces an insertion loss and a power waste.

Figure 7:
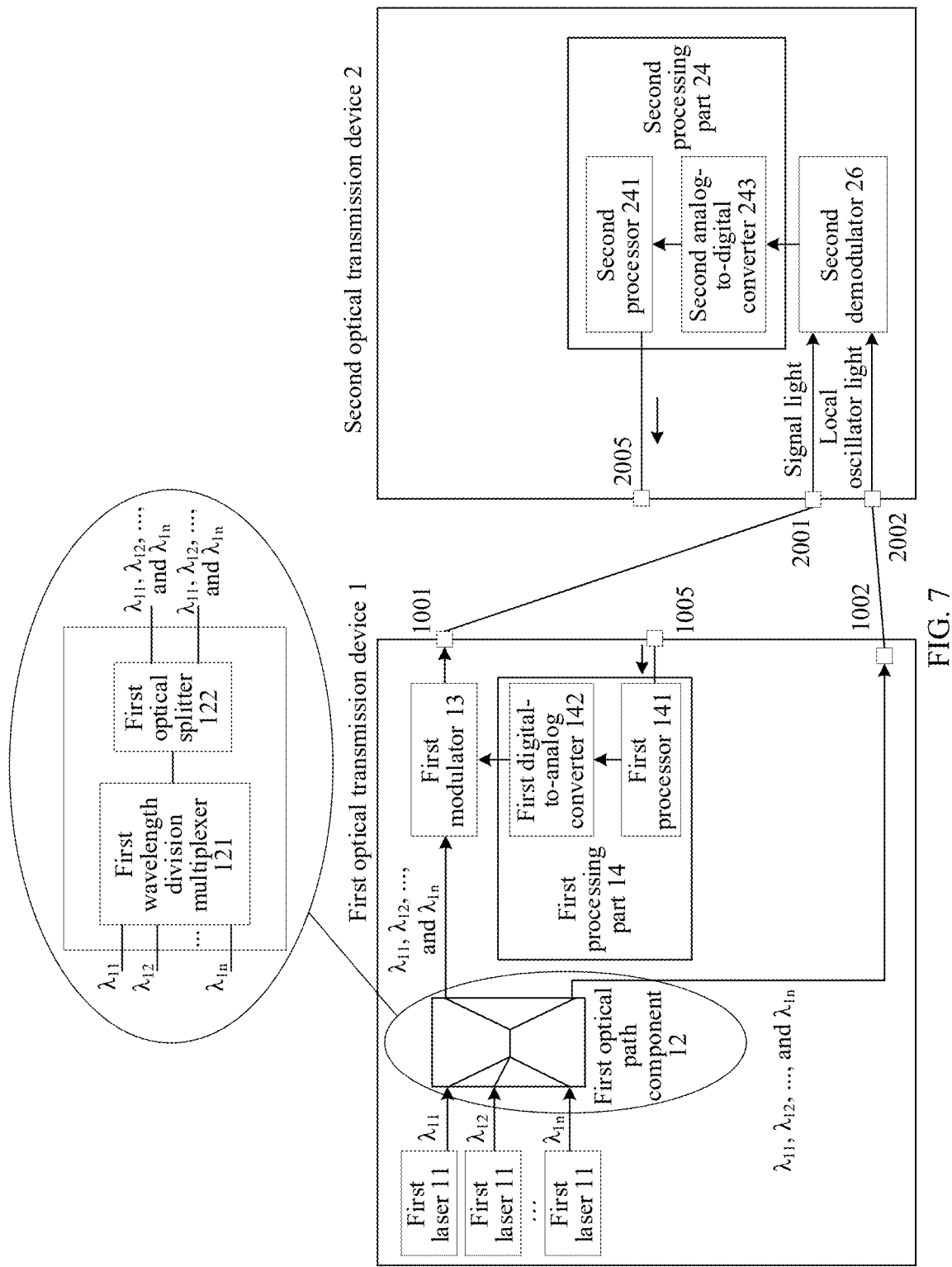
FIG. 7 is a schematic diagram of a structure of an optical transmission system and optical transmission devices in the optical transmission system according to an embodiment of this application.

Alternatively, the first optical path component 12 may include a first wavelength division multiplexer 121 and a first optical splitter 122. As shown in FIG. 7, the first wavelength division multiplexer 121 includes a plurality of optical input ports and one optical output port. The first optical splitter 122 includes one optical input port, a first optical output port, and a second optical output port. The optical output port of the first wavelength division multiplexer 121 is optically connected to the optical input port of the first optical splitter 122.

The plurality of optical input ports of the first wavelength division multiplexer 121 are the plurality of optical input ports of the first optical path component 12. The first optical output port and the second optical output port of the first optical splitter 122 are the first optical output port and the second optical output port of the first optical path component 12. The first wavelength division multiplexer 121 is configured to perform multiplexing on continuous light of different wavelengths output by the plurality of first lasers 11. The first optical splitter 122 is configured to perform power splitting on multiplexed continuous light to obtain two paths of continuous light, to obtain the two paths of continuous light that are the same. Although a wavelength division multiplexer has a specific insertion loss, a wavelength division multiplexer with a low insertion loss can be used, and a corresponding insertion loss is tolerable.

The second optical path component 22 may also be a coupler. The coupler may be an M×2 coupler, for example, a 2×2 coupler or a 3×2 coupler. A value of M is determined based on a quantity of the second lasers 21.

The second optical path component 22 includes a fourth wavelength division multiplexer 221 and a second optical splitter 222. The fourth wavelength division multiplexer 221 includes a plurality of optical input ports and one optical output port. The second optical splitter 222 includes one optical input port, a first optical output port, and a second optical output port. The optical output port of the fourth wavelength division multiplexer 221 is optically connected to the optical input port of the second optical splitter 222.

The plurality of optical input ports of the fourth wavelength division multiplexer 221 are the plurality of optical input ports of the second optical path component 22. The first optical output port and the second optical output port of the second optical splitter 222 are the first optical output port and the second optical output port of the second optical path component 22. The fourth wavelength division multiplexer 221 is configured to perform multiplexing on continuous light of different wavelengths output by the plurality of second lasers 21. The first optical splitter 122 is configured to perform power splitting on multiplexed continuous light, to obtain two paths of continuous light that are the same.

Figure 8:
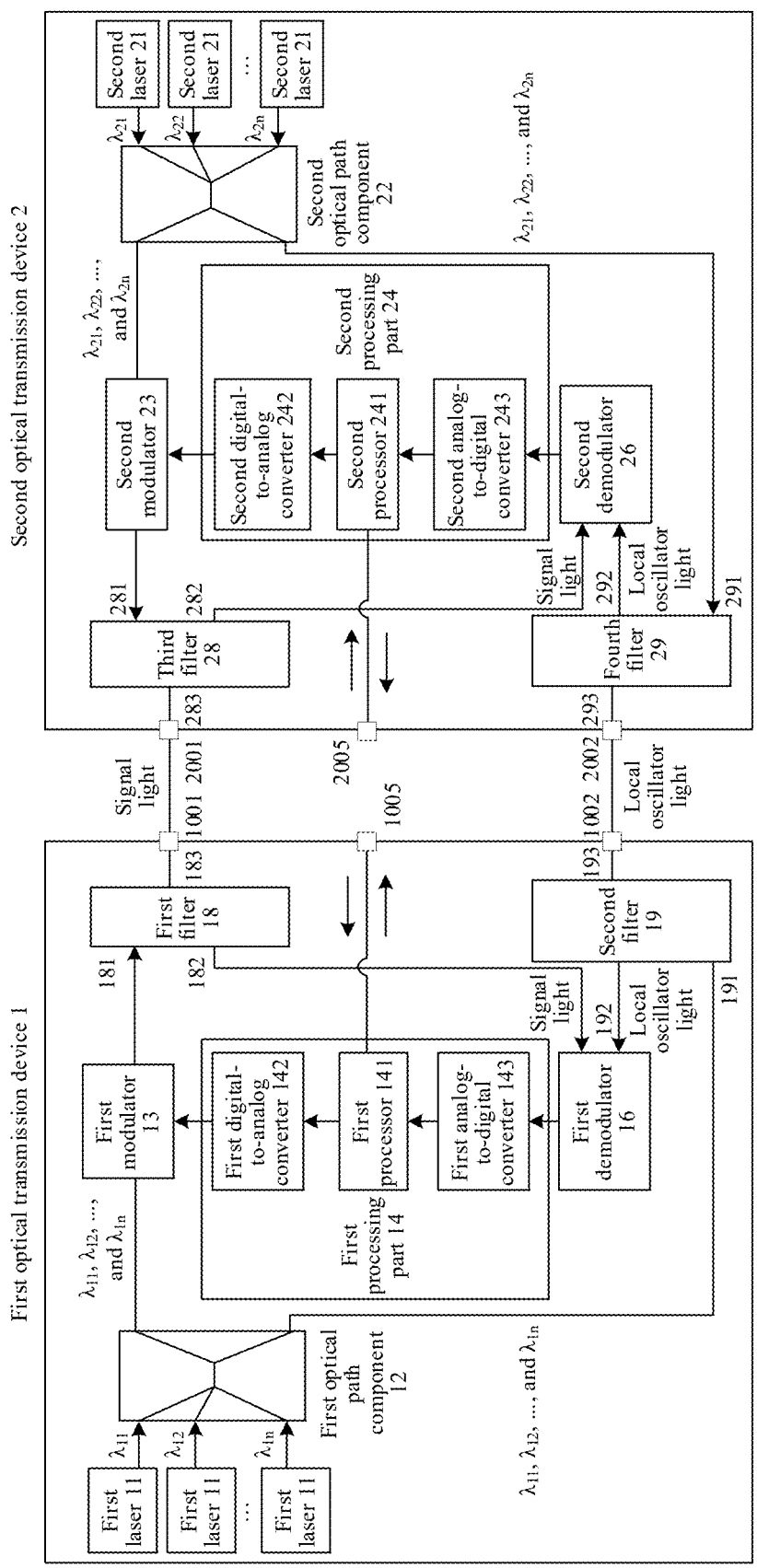
FIG. 8 is a schematic diagram of a structure of an optical transmission system and optical transmission devices in the optical transmission system according to an embodiment of this application.

In the optical transmission system shown in FIG. 5, to decrease a quantity of optical fibers connected between devices, two filters may be disposed in the first optical transmission device 1, and two filters may also be disposed in the second optical transmission device 2, as shown in FIG. 8.

First Optical Transmission Device 1

Based on the structure in FIG. 5, the first optical transmission device 1 may further include a first filter 18 and a second filter 19. The first filter 18 is optically connected to the optical output port of the first modulator 13 and the signal light input port of the first demodulator 16, and the second filter 19 is optically connected to the second optical output port of the first optical path component 12 and the local oscillator light input port of the first demodulator 16.

The first filter 18 and the second filter 19 may further be optically connected to an optical transmission device at a peer end, for example, the second optical transmission device 2. As shown in FIG. 8, the first filter 18 includes a first optical port 181, a second optical port 182, and a third optical port 183. The first optical port 181 is an optical input port of a transmit optical path. The second optical port 182 is an optical output port of a receive optical path. The third optical port 183 is an optical output port of the transmit optical path and an optical input port of the receive optical path. The second filter 19 includes a fourth optical port 191, a fifth optical port 192, and a sixth optical port 193. The fourth optical port 191 is an optical input port of a transmit optical path. The fifth optical port 192 is an optical output port of a receive optical path. The sixth optical port 193 is an optical output port of the transmit optical path and an optical input port of the receive optical path. The optical output port of the first modulator 13 is optically connected to the first optical port 181 of the first filter 18. The second optical output port of the optical path processing component 12 is optically connected to the fourth optical port 191 of the second filter 19. The signal light input port of the first demodulator 16 is optically connected to the second optical port 182 of the first filter 18. The local oscillator light input port of the first demodulator 16 is optically connected to the fifth optical port 192 of the second filter 19. The third optical port 183 of the first filter 18 may be configured to be optically connected to the optical transmission device at the peer end. The sixth optical port 193 of the second filter 19 may be configured to be optically connected to the optical transmission device at the peer end.

In this case, the first optical transmission device 1 needs only two external optical ports, which may be an optical port 1001 and an optical port 1002 respectively. The third optical port 183 of the first filter 18 is optically connected to the optical port 1001. The sixth optical port 193 of the second filter 19 is optically connected to the optical port 1002.

The first filter (18) is configured to: send the signal light emitted by the first modulator 13 to the second optical transmission device 2 at the peer end, and send the signal light emitted by the second optical transmission device 2 at the peer end to the first demodulator 16. The second filter 19 is configured to: send the continuous light emitted by the first optical path component 12 to the second optical transmission device 2 at the peer end, and send the continuous light emitted by the second optical transmission device 2 at the peer end to the first demodulator 16.

Second Optical Transmission Device 2

Based on the structure in FIG. 5, the second optical transmission device 2 may further include a third filter 28 and a fourth filter 29. The third filter 28 is optically connected to the optical output port of the second modulator 23 and the signal light input port of the second demodulator 26, and the fourth filter 29 is optically connected to the second optical output port of the second optical path component 22 and the local oscillator light input port of the second demodulator 26.

The third filter 28 and the fourth filter 29 may further be optically connected to an optical transmission device at a peer end, for example, the first optical transmission device 1. As shown in FIG. 8, the third filter 28 includes a first optical port 281, a second optical port 282, and a third optical port 283. The first optical port 281 is an optical input port of a transmit optical path. The second optical port 282 is an optical output port of a receive optical path. The third optical port 283 is an optical output port of the transmit optical path and an optical input port of the receive optical path. The fourth filter 29 includes a fourth optical port 291, a fifth optical port 292, and a sixth optical port 293. The fourth optical port 291 is an optical input port of a transmit optical path. The fifth optical port 292 is an optical output port of a receive optical path. The sixth optical port 293 is an optical output port of the transmit optical path and an optical input port of the receive optical path. The optical output port of the second modulator 23 is optically connected to the first optical port 281 of the third filter 28. The second optical output port of the second optical path processing component 22 is optically connected to the fourth optical port 291 of the fourth filter 29. The signal light input port of the second demodulator 26 is optically connected to the second optical port 282 of the third filter 28. The local oscillator light input port of the second demodulator 26 is optically connected to the fifth optical port 292 of the fourth filter 29. The third optical port 283 of the third filter 28 may be configured to be optically connected to the optical transmission device at the peer end. The sixth optical port 293 of the fourth filter 29 may be configured to be optically connected to the optical transmission device at the peer end.

In this case, the second optical transmission device 2 needs only two external optical ports, which may be an optical port 2001 and an optical port 2002 respectively. The third optical port 283 of the third filter 28 is optically connected to the optical port 2001. The sixth optical port 293 of the fourth filter 29 is optically connected to the optical port 2002.

The third filter 28 is configured to: send the signal light emitted by the second modulator 23 to the first optical transmission device 1 at the peer end, and send the signal light emitted by the first optical transmission device 1 to the second demodulator 26. The fourth filter 29 is configured to: send the continuous light emitted by the second optical path component 22 to the first optical transmission device 1 at the peer end, and send the continuous light emitted by the first optical transmission device 1 to the second demodulator 26.

Based on the structures of the first optical transmission device 1 and the second optical transmission device 2, the first filter 18 may be optically connected to the third filter 28, and the second filter 19 may be optically connected to the fourth filter 29. Specifically, the optical port 1001 may be optically connected to the optical port 2001, and the optical port 1002 may be optically connected to the optical port 2002.

The first filter 18 is configured to: send the signal light emitted by the first modulator 13 to the third filter 28, and send signal light sent by the third filter 28 to the first demodulator 16. The fourth filter 29 is configured to: send the continuous light sent by the second optical path component 22 to the second filter 19, and send continuous light sent by the second filter 19 to the second demodulator 26. The third filter 28 is configured to: send the signal light emitted by the second modulator 23 to the first filter 18, and send signal light sent by the first filter 18 to the second demodulator 26. The fourth filter 29 is configured to: send the continuous light sent by the second optical path component 22 to the second filter 19, and send continuous light sent by the second filter 19 to the second demodulator 26.

Based on the foregoing setting of the filter, some restrictions may be imposed on the wavelengths of the plurality of first lasers 11 and the plurality of second lasers 21, so that there is no intersection set between a wavelength interval (which may be a wavelength interval between a maximum value and a minimum value in $\lambda_{11}, \lambda_{12}, \ldots,$ and $\lambda_{1n}$) within which the wavelengths $\lambda_{11}, \lambda_{12}, \ldots,$ and $\lambda_{1n}$ of the plurality of first lasers 11 fall and a wavelength interval (which may be a wavelength interval between a maximum value and a minimum value in $\lambda_{21}, \lambda_{22}, \ldots,$ and $\lambda_{2n}$) within which the wavelengths $\lambda_{21}, \lambda_{22},$ and $\lambda_{2n}$ of the plurality of second lasers 21 fall.

The first filter 18 may be a CWDM. A multi-port side of the CWDM includes the first optical port 181 and the second optical port 182, and a single-port side includes the third optical port 183. The first optical port 181 corresponds to a first wavelength range. The second optical port 182 corresponds to a second wavelength range. The third optical port 183 corresponds to a third wavelength range. The different wavelengths corresponding to the plurality of first lasers 11 fall within the first wavelength range. Different wavelengths corresponding to a plurality of second lasers 21 fall within the second wavelength range. The third wavelength range is a union set of the first wavelength range and the second wavelength range. In this way, the third optical port 183 may transmit a bidirectional optical signal, to implement a single-fiber bidirectional function.

The second filter 19, the third filter 28, and the fourth filter 29 may also be a CWDM. Setting of a wavelength range of the optical port is the same as that of the first filter 18, and details are not described again.

Figure 9:
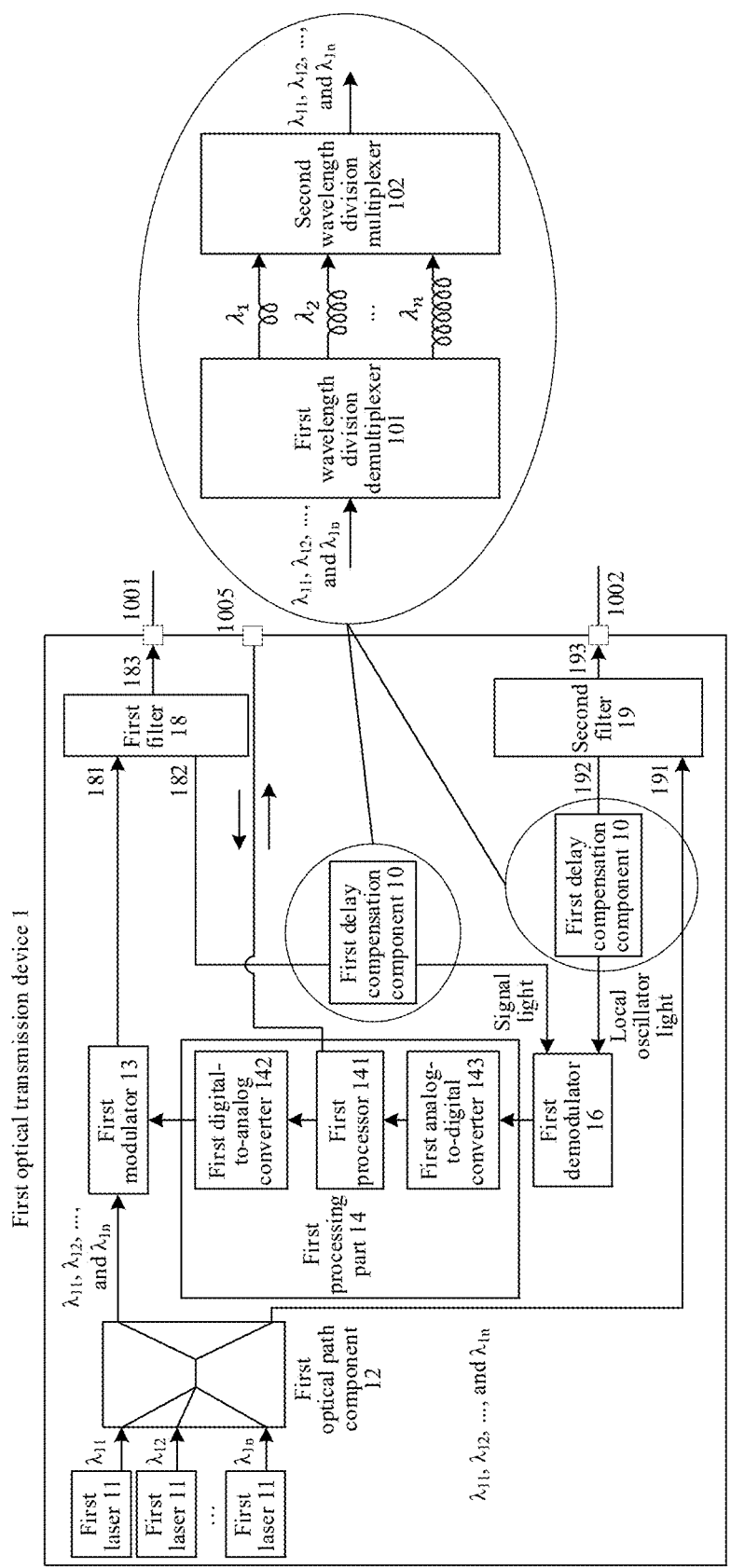
FIG. 9 is a schematic diagram of a structure of an optical transmission device according to an embodiment of this application.

In this embodiment of this application, in a case of long-distance transmission, due to impact of first-order dispersion, a delay exists between signal light of different wavelengths. Therefore, delay compensation may be performed by using a specific structure. Correspondingly, as shown in FIG. 9, the first optical transmission device 1 may have the following structure: A first delay compensation component 10 is separately disposed on an optical path between the first filter 18 and the first demodulator 16 and an optical path between the second filter 19 and the first demodulator 16. The first delay compensation component 10 includes a first wavelength division demultiplexer 101 and a second wavelength division multiplexer 102, wavelengths of a plurality of optical output ports of the first wavelength division demultiplexer 101 are respectively the wavelengths of the plurality of first lasers 11, and wavelengths of a plurality of optical input ports of the second wavelength division multiplexer 102 are respectively the wavelengths of the plurality of first lasers 11. An optical fiber is connected between an optical output port of the first wavelength division demultiplexer 101 and an optical input port of the second wavelength division multiplexer 102 that correspond to a same wavelength, each optical fiber has a different length and a length of each optical fiber is determined based on a wavelength corresponding to the optical fiber and a transmission distance between a local end and a peer end.

In an implementation, the first wavelength division demultiplexer 101 may perform demultiplexing on signal light or continuous light received from an optical transmission device at a peer end to obtain a plurality of light of different wavelengths, and then transmit the light of different wavelengths through fibers of different lengths. After the transmission, multiplexing is performed to obtain signal light or continuous light of a plurality of wavelengths, and the signal light or continuous light is input to a subsequent component. Calculation of lengths of optical fibers corresponding to the different wavelengths may be: Transmission duration of the different wavelengths is first determined based on the transmission distance between the local end and the peer end, and delays of the different wavelengths are determined based on the transmission duration of the different wavelengths, so that a sum of transmission duration and a delay that correspond to each wavelength is equal. Then, a length of a corresponding optical fiber is determined based on a delay and a transmission speed of each wavelength. Delay compensation may be performed on an optical path by using the foregoing structure, to ensure accuracy of data transmission.

The second optical transmission device 2 may have the following structure: A second delay compensation component 20 is separately disposed on an optical path between the third filter 28 and the second demodulator 26 and an optical path between the fourth filter 29 and the second demodulator 26. The second delay compensation component 20 includes a third wavelength division demultiplexer 201 and a fifth wavelength division multiplexer 202, wavelengths of a plurality of optical output ports of the third wavelength division demultiplexer 201 are respectively the wavelengths of the plurality of second lasers 21, and wavelengths of a plurality of optical input ports of the fifth wavelength division multiplexer 202 are respectively the wavelengths of the plurality of second lasers 21. An optical fiber is connected between an optical output port of the third wavelength division demultiplexer 201 and an optical input port of the fifth wavelength division multiplexer 202 that correspond to a same wavelength, each optical fiber has a different length and a length of each optical fiber is determined based on a wavelength corresponding to the optical fiber and a transmission distance between a local end and a peer end.

The delay compensation component in the second optical transmission device 2 is the same as that in the first optical transmission device 1, and details are not described herein again.

Figure 10:
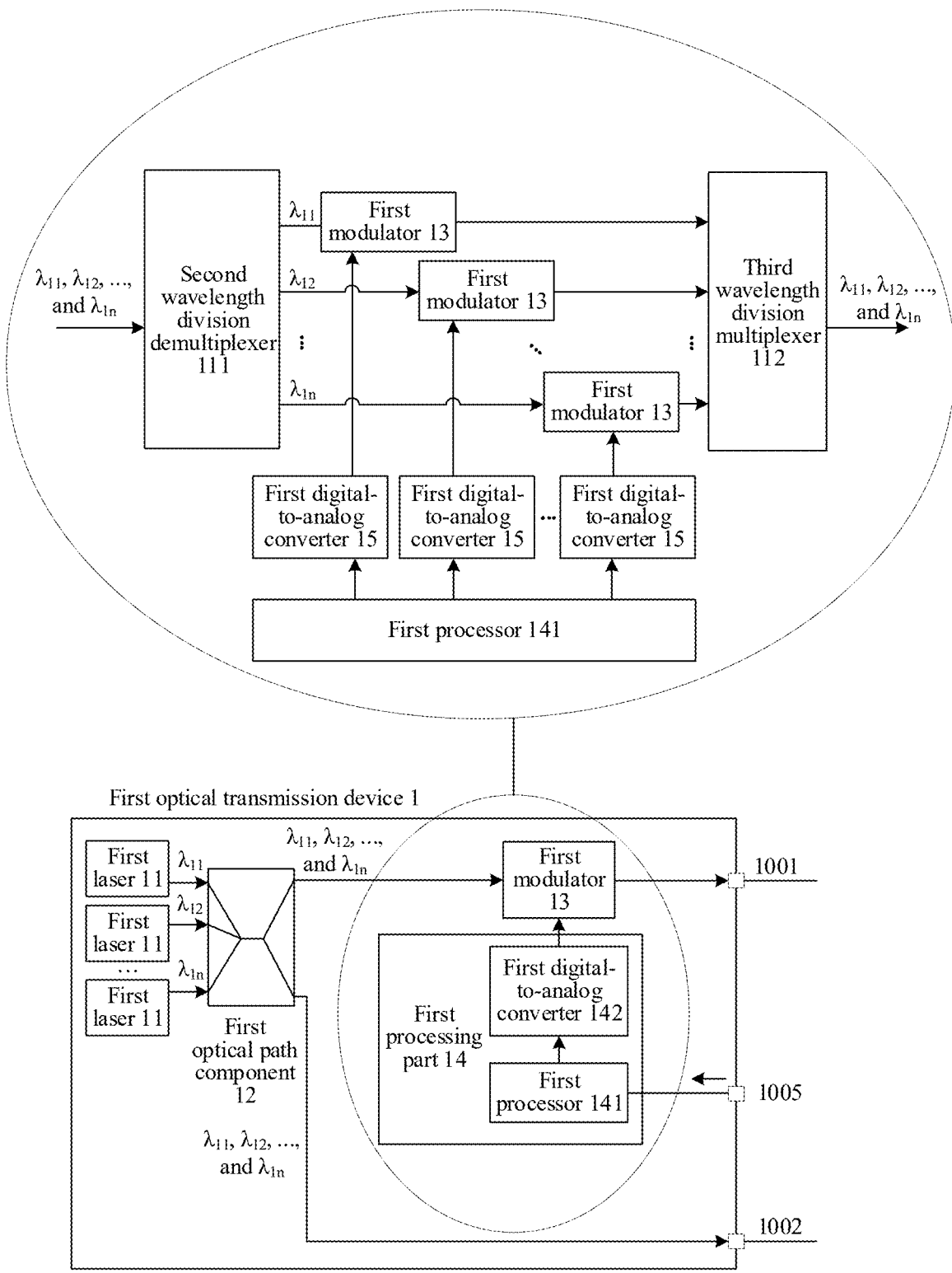
FIG. 10 is a schematic diagram of a structure of an optical transmission device according to an embodiment of this application.

The foregoing provides a structure for delay compensation on an optical path, and the following provides a structure for delay compensation on an electric path. Correspondingly, as shown in FIG. 10, the first optical transmission device 1 may have the following structure: The first optical transmission device 1 includes first digital-to-analog converters 142 and first modulators 13 that respectively correspond to the wavelengths of the first lasers 11, and the first optical transmission device 1 further includes a second wavelength division demultiplexer 111 and a third wavelength division multiplexer 112. Wavelengths of a plurality of optical output ports of the second wavelength division demultiplexer 111 are respectively the wavelengths of the plurality of first lasers 11, and wavelengths of a plurality of optical input ports of the third wavelength division multiplexer 112 are respectively the wavelengths of the plurality of first lasers 11. A first optical output port of the first optical path component 12 is optically connected to an optical input port of the second wavelength division demultiplexer 111, each optical output port of the second wavelength division demultiplexer 111 is optically connected to an optical input port of the first modulator 13 that corresponds to a same wavelength, each of the plurality of optical input ports of the third wavelength division multiplexer 112 is optically connected to an optical output port of the first modulator 13 that corresponds to a same wavelength, and an optical output port of the third wavelength division multiplexer 112 is configured to be optically connected to a transmission device at a peer end. Each first digital-to-analog converter 142 is electrically connected to an electrical input port of the first modulator 13 that corresponds to a same wavelength. Internal processing delays of the first digital-to-analog converters 142 corresponding to the different wavelengths are different, and are determined based on corresponding wavelengths and transmission distances between a local end and a peer end.

In an implementation, before continuous light output from the first optical output port of the first optical path component 12 enters the first modulator 13, the continuous light first enters the second wavelength division demultiplexer 111 for demultiplexing, to obtain a plurality of continuous light of different wavelengths. These wavelengths are respectively the same as the wavelengths of the first lasers 11, and the continuous light of different wavelengths is respectively input to the optical input ports of the different first modulators 13. In addition, a processor separately inputs a digital signal to the plurality of first digital-to-analog converters 142 corresponding to the different wavelengths. The digital signals input to the different first digital-to-analog converters 142 may be the same. Delay paths of different delays are disposed inside the first digital-to-analog converters 142 of different wavelengths, to respectively convert a digital signal into an analog signal, and a specific delay is added to processing duration in a conversion process. Then, the analog signal is input to the corresponding first modulator 13, the analog signal and the continuous light of different wavelengths are modulated by the first modulator 13 to obtain signal light of different wavelengths, and the signal light is input to the third wavelength division multiplexer 112 for multiplexing, to obtain signal light of a plurality of wavelengths. In this case, time points at which the analog signals are modulated on the signal light of different wavelengths are different. Calculation of delays corresponding to the first digital-to-analog converters 142 corresponding to the different wavelengths may be: Transmission duration of the different wavelengths is first determined based on the transmission distance between the local end and the peer end, and delays of the different wavelengths are determined based on the transmission duration of the different wavelengths, so that a sum of transmission duration and a delay that correspond to each wavelength is equal. In this way, the delays corresponding to the first digital-to-analog converters 142 corresponding to the different wavelengths are obtained. A delay corresponding to the first digital-to-analog converter 142 may be implemented in a manner such as a delayer. Delay compensation may be performed on an electrical path by using the foregoing structure, to ensure accuracy of data transmission.

The second optical transmission device 2 may have the following structure: The second optical transmission device 2 includes second digital-to-analog converters 242 and second modulators 23 that respectively correspond to the wavelengths of the second lasers 21, and the second optical transmission device 2 further includes a fourth wavelength division demultiplexer 211 and a sixth wavelength division multiplexer 212. Wavelengths of a plurality of optical output ports of the fourth wavelength division demultiplexer 211 are respectively the wavelengths of the plurality of second lasers 21, and wavelengths of a plurality of optical input ports of the sixth wavelength division multiplexer 212 are respectively the wavelengths of the plurality of second lasers 21. A first optical output port of the second optical path component 22 is optically connected to an optical input port of the fourth wavelength division demultiplexer 211, each optical output port of the fourth wavelength division demultiplexer 211 is optically connected to an optical input port of the second modulator 23 that corresponds to a same wavelength, each of the plurality of optical input ports of the sixth wavelength division multiplexer 212 is optically connected to an optical output port of the second modulator 23 that corresponds to a same wavelength, and an optical output port of the sixth wavelength division multiplexer 212 is configured to be optically connected to a transmission device at a peer end. Each second digital-to-analog converter 242 is electrically connected to an electrical input port of the second modulator 23 that corresponds to a same wavelength. Internal processing delays of the second digital-to-analog converters 242 corresponding to the different wavelengths are different, and are determined based on corresponding wavelengths and transmission distances between a local end and a peer end.

The delay compensation component in the second optical transmission device 2 is the same as that in the first optical transmission device 1, and details are not described herein again.

In addition to the foregoing delay compensation on the optical path and delay compensation on the electrical path, the first optical transmission device 1 may further perform delay compensation in the first processing part 14. A device structure is similar to the structure in FIG. 10, and a difference lies in that delays of the plurality of first digital-to-analog converters 142 are the same. Before sending a digital signal to the first digital-to-analog converters 142 corresponding to the different wavelengths, the first processing part 14 performs a delay. A calculation method of delays corresponding to the different wavelengths is the same as a calculation method for delay compensation performed on the electrical path. The second optical transmission device 2 may also use delay compensation in this manner.

It should be noted that, in the foregoing embodiments, it is described by using the optical transmission system including the first optical transmission device 1 and the second optical transmission device 2. In practice, the first optical transmission device 1 does not necessarily need to be used collaboratively with the second optical transmission device 2. As long as an optical transmission device includes a demodulator having a coherent detection function, and both a signal light input port and a local oscillator light input port of the demodulator are optically connected to an external device, the first optical transmission device 1 may be used collaboratively with the optical transmission device.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A first optical transmission device comprising:
 a plurality of first lasers, each laser of the plurality of first lasers having a different corresponding wavelength; a first optical path component; a first modulator; a first processor portion; a first demodulator; a first filter; and a second filter,
 wherein the plurality of first lasers are optically connected to a plurality of optical input ports of the first optical path component respectively;
 the first optical path component is configured to: perform multiplexing on continuous light of different wavelengths emitted by the plurality of first lasers, and perform power splitting of multiplexed continuous light thereby obtaining two paths of continuous light, send a first path of continuous light of the two paths of continuous light to the first modulator, and send a second path of continuous light of the two paths of continuous light to a second optical transmission device at a peer end;
 the first processor portion is configured to send a first analog signal to the first modulator; and
 the first modulator is configured to: modulate the first analog signal onto the first path of continuous light of the two paths of continuous light, thereby obtaining a signal light, and send the signal light to the second optical transmission device at the peer end;

the first demodulator is configured to: receive signal light and continuous light from the second optical transmission device at the peer end, perform coherent detection based on the received signal light and continuous light thereby obtaining a second analog signal, and send the second analog signal to the first processor portion;

the first filter is configured to: send the signal light from the first modulator to the second optical transmission device at the peer end, and send the signal light from the second optical transmission device at the peer end to the first demodulator; and the second filter is configured to: send the continuous light from the first optical path component to the second optical transmission device at the peer end, and send the continuous light from the second optical transmission device at the peer end to the first demodulator.

2. The first optical transmission device according to claim 1, wherein the first optical path component is a coupler.

3. The first optical transmission device according to claim 1, wherein the first optical path component comprises:
a first wavelength division multiplexer; and
a first optical splitter,
wherein the first wavelength division multiplexer is configured to perform the multiplexing on the continuous light of different wavelengths emitted by the plurality of first lasers, and the first optical splitter is configured to perform the power splitting on multiplexed continuous light thereby obtaining the two paths of continuous light.

4. The first optical transmission device according to claim 1, further comprising:
a first delay compensation component separately disposed on a first optical path between the first filter and the first demodulator and a second optical path between the second filter and the first demodulator;
the first delay compensation component comprises:
a first wavelength division demultiplexer; and
a second wavelength division multiplexer, wavelengths of a plurality of optical output ports of the first wavelength division demultiplexer are respectively the wavelengths of the plurality of first lasers, and wavelengths of a plurality of optical input ports of the second wavelength division multiplexer are respectively the wavelengths of the plurality of first lasers; and
an optical fiber of a plurality of optical fibers is connected between an optical output port of the plurality of optical output ports of the first wavelength division demultiplexer and an optical input port of the plurality of optical input ports of the second wavelength division multiplexer that correspond to a same wavelength, each optical fiber of the plurality of optical fibers has a different corresponding length and each length of each optical fiber of the plurality of optical fibers is determined based on a wavelength corresponding to the optical fiber of the plurality of optical fibers and a transmission distance between a local end and the peer end.

5. The first optical transmission device according to claim 1, wherein the first demodulator is an integrated coherent receiver (ICR).

6. The first optical transmission device according to claim 1, wherein the first processor portion comprises:
a first processor; and
a first analog-to-digital converter, wherein the first analog-to-digital converter is configured to: convert the second analog signal into a second digital signal, and send the second digital signal to the first processor.

7. The first optical transmission device according to claim 1, wherein the first modulator is a dual-polarization IQ modulator (DP-IQM).

8. The first optical transmission device according to claim 1, wherein the first laser is a distributed feedback (DFB) laser.

9. An optical transmission system, comprising a first optical transmission device; and a second optical transmission device, wherein
the first optical transmission device comprises: a plurality of first lasers, a first optical path component; a first modulator; a first processor portion; a first demodulator; a first filter, and a second filter, wherein each laser of the plurality of first lasers having a different corresponding wavelength; wherein the plurality of first lasers are optically connected to a plurality of optical input ports of the first optical path component respectively;

the second optical transmission device comprises: a second processor portion; a second demodulator; a second optical path component; a second modulator; a plurality of second lasers; a third filter, and a fourth filter, wherein each laser of the plurality of second lasers having a different corresponding wavelength;

the first optical path component is configured to: perform multiplexing on continuous light of different wavelengths emitted by the plurality of first lasers, and perform power splitting of multiplexed continuous light thereby obtaining two paths of continuous light, send a first path of continuous light of the two paths of continuous light to the first modulator, and send a second path of continuous light of the two paths of continuous light to the second demodulator;

the first processor portion is configured to send a first analog signal to the first modulator;

the first modulator is configured to: modulate the first analog signal onto the first path of continuous light of the two paths of continuous light, thereby obtaining a signal light, and send the signal light to the second demodulator;

the second demodulator is configured to: perform coherent detection based on the received signal light and continuous light thereby obtaining the first analog signal, and send the first analog signal to the second processor portion;

the plurality of second lasers are optically connected to a plurality of optical input ports of the second optical path component respectively;

the second optical path component is configured to: perform multiplexing on continuous light of different wavelengths emitted by the plurality of second lasers, and perform power splitting of multiplexed continuous light thereby obtaining another two paths of continuous light, send a third path of continuous light of the another two paths of continuous light to the second modulator, and send a fourth path of continuous light of the another two paths of continuous light to the first demodulator;

the second processor portion is configured to send a second analog signal to the second modulator;

the second modulator is configured to: modulate the second analog signal onto the third path of the another two paths of continuous light thereby obtaining signal light, and send the signal light to the first demodulator;

the first demodulator is configured to: perform coherent detection based on the received signal light and continuous light thereby obtaining the second analog signal, and send the second analog signal to the first processor portion;

the first filter is configured to: send the signal light from the first modulator to the third filter, and send signal light from the third filter to the first demodulator;

the second filter is configured to: send the continuous light from the first optical path component to the fourth filter, and send continuous light from the fourth filter to the first demodulator;

the third filter is configured to: send the signal light from the second modulator to the first filter, and send the signal light from the first filter to the second demodulator; and the fourth filter is configured to: send the continuous light from the second optical path component to the second filter, and send the continuous light from the second filter to the second demodulator.

10. The optical transmission system according to claim 9, wherein
the first optical path component is a coupler; or
the first optical path component comprises:
a first wavelength division multiplexer; and
a first optical splitter, wherein the first wavelength division multiplexer is configured to perform the multiplexing on the continuous light of different wavelengths emitted by the plurality of first lasers, and the first optical splitter is configured to perform the power splitting on multiplexed continuous light thereby obtaining the two paths of continuous light.

11. The optical transmission system according to claim 9, wherein
the second optical path component is a coupler; or
the second optical path component comprises:
a fourth wavelength division multiplexer; and
a second optical splitter, wherein the fourth wavelength division multiplexer is configured to perform the multiplexing on the continuous light of different wavelengths emitted by the plurality of second lasers, and the second optical splitter is configured to perform the power splitting on multiplexed continuous light thereby obtaining the another two paths of continuous light.

12. The optical transmission system according to claim 9, further comprising:
a first delay compensation component separately disposed on a first optical path between the first filter and the first demodulator and a second optical path between the second filter and the first demodulator;
the first delay compensation component comprises:
a first wavelength division demultiplexer; and
a second wavelength division multiplexer, wavelengths of a plurality of optical output ports of the first wavelength division demultiplexer are respectively the wavelengths of the plurality of first lasers, and wavelengths of a plurality of optical input ports of the second wavelength division multiplexer are respectively the wavelengths of the plurality of first lasers; and
an optical fiber of a plurality of optical fibers is connected between an optical output port of the plurality of optical output ports of the first wavelength division demultiplexer and an optical input port of the plurality of optical input ports of the second wavelength division multiplexer that correspond to a same wavelength, each optical fiber of the plurality of optical fibers has a different corresponding length and each length of each optical fiber of the plurality of optical fibers is determined based on a wavelength corresponding to the optical fiber of the plurality of optical fibers and a first transmission distance between a local end and a peer end.

13. The optical transmission system according to claim 9, further comprising:
a second delay compensation component separately disposed on a third optical path between the third filter and the second demodulator and a fourth optical path between the fourth filter and the second demodulator;
the second delay compensation component comprises:
a third wavelength division demultiplexer; and
a fifth wavelength division multiplexer, wavelengths of a plurality of optical output ports of the third wavelength division demultiplexer are respectively the wavelengths of the plurality of second lasers, and wavelengths of a plurality of optical input ports of the fifth wavelength division multiplexer are respectively the wavelengths of the plurality of second lasers; and
an optical fiber of another plurality of optical fibers is connected between an optical output port of the plurality of optical output ports of the third wavelength division demultiplexer and an optical input port of the plurality of optical input ports of the fifth wavelength division multiplexer that correspond to a same wavelength, each optical fiber of the another plurality of optical fibers has a different length and each length of each optical fiber of the another plurality of optical fibers is determined based on a wavelength corresponding to the optical fiber of the another plurality of optical fibers and a second transmission distance between a local end and a peer end.

14. The optical transmission system according to claim 9, wherein the first demodulator and the second demodulator are integrated coherent receivers (ICRs).

15. A first optical transmission device comprising:
a plurality of first lasers, each laser of the plurality of first lasers having a different corresponding wavelength; a first optical path component; a first modulator; a first processor portion; and a first set of circuits, wherein
the first processor portion comprises:
a first processor; and a first digital-to-analog converter, wherein the first processor is configured to send a first digital signal to the first digital-to-analog converter; and the first digital-to-analog converter is configured to: convert the first digital signal into a first analog signal, and send the first analog signal to the first modulator; and
each circuit of the set of circuits comprises:
the first digital-to-analog converter; and the first modulator;
wherein the plurality of first lasers are optically connected to a plurality of optical input ports of the first optical path component respectively;
the first optical path component is configured to: perform multiplexing on continuous light of different wavelengths emitted by the plurality of first lasers, and perform power splitting on multiplexed continuous light thereby obtaining two paths of continuous light, send a first path of continuous light of the two paths of continuous light to the first modulator, and send a second path of continuous light of the two paths of continuous light to a second optical transmission device at a peer end;

the first processor portion is configured to send the first analog signal to the first modulator;

the first modulator is configured to: modulate the first analog signal onto the first path of continuous light of the two paths of continuous light, thereby obtaining a signal light, and send the signal light to the second optical transmission device at the peer end;

wherein each first digital-to-analog converter and each first modulator corresponds to one wavelength of the different wavelengths, and the first optical transmission device further comprises a second wavelength division demultiplexer and a third wavelength division multiplexer;

wavelengths of a plurality of optical output ports of the second wavelength division demultiplexer are respectively the wavelengths of the plurality of first lasers, and wavelengths of a plurality of optical input ports of the third wavelength division multiplexer are respectively the wavelengths of the plurality of first lasers;

a first optical output port of the first optical path component is optically connected to an optical input port of the second wavelength division demultiplexer, each optical output port of the plurality of optical output ports of the second wavelength division demultiplexer is optically connected to an optical input port of the plurality of optical input ports of the first modulator that corresponds to a same wavelength, each of the plurality of optical input ports of the third wavelength division multiplexer is optically connected to an optical output port of the plurality of optical output ports of the first modulator that corresponds to a same wavelength, and an optical output port of the plurality of optical output ports of the third wavelength division multiplexer is configured to be optically connected to a transmission device at the peer end;

each first digital-to-analog converter is electrically connected to an electrical input port of the first modulator that corresponds to a same wavelength; and internal processing delays of each corresponding first digital-to-analog converters is different, corresponds to the different wavelengths, and are determined based on corresponding wavelengths and transmission distances between a local end and the peer end.

* * * * *